United States Patent
Yoshitake et al.

(10) Patent No.: US 12,148,303 B2
(45) Date of Patent: Nov. 19, 2024

(54) SENSING DEVICE, MOVING BODY SYSTEM AND SENSING METHOD

(71) Applicant: OMRON Corporation, Kyoto (JP)

(72) Inventors: Naoki Yoshitake, Kusatsu (JP); Keiki Matsuura, Nara (JP); Yoshitaka Tsurukame, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 672 days.

(21) Appl. No.: 17/274,289

(22) PCT Filed: Mar. 12, 2019

(86) PCT No.: PCT/JP2019/009942
§ 371 (c)(1),
(2) Date: Mar. 8, 2021

(87) PCT Pub. No.: WO2020/070909
PCT Pub. Date: Apr. 9, 2020

(65) Prior Publication Data
US 2021/0350706 A1    Nov. 11, 2021

(30) Foreign Application Priority Data
Oct. 5, 2018    (JP) .................................. 2018-190260

(51) Int. Cl.
*B60Q 9/00*    (2006.01)
*B60W 30/09*    (2012.01)
(Continued)

(52) U.S. Cl.
CPC ............. *G08G 1/167* (2013.01); *B60Q 9/008* (2013.01); *B60W 30/09* (2013.01); *G06T 7/521* (2017.01);
(Continued)

(58) Field of Classification Search
CPC ............. B60W 30/09; B60W 2420/42; B60W 2420/52; B60W 2554/4041;
(Continued)

(56) References Cited

U.S. PATENT DOCUMENTS

2006/0284760 A1* 12/2006 Natsume ................ G08G 1/167
                                                                342/72
2009/0058677 A1    3/2009 Tseng et al.
(Continued)

FOREIGN PATENT DOCUMENTS

JP    2006349456 A    12/2006
JP    2010267211 A    11/2010
(Continued)

OTHER PUBLICATIONS

International Search Report for International Application No. PCT/JP2019/009942; Date of Mailing, Jun. 18, 2019.
(Continued)

*Primary Examiner* — Ian Jen
*Assistant Examiner* — Hossam M Abd El Latif
(74) *Attorney, Agent, or Firm* — CANTOR COLBURN LLP

(57) ABSTRACT

A sensing device senses an object present in a blind spot in the surrounding environment of a moving body. The sensing device is provided with a detection unit, a distance measurement unit, and a control unit. The detection unit radiates a physical signal from the moving body to the surrounding environment, and detects a reflection signal which is a reflection of the radiated physical signal. The distance measurement unit detects distance information indicating the distance from the moving body to the surrounding environment. The control unit analyzes the result of the detection by the detection unit. The control unit: senses, on the basis of the distance information, a blind spot region indicating a blind spot in the surrounding environment, and another moving body travelling in front of the moving body towards the blind spot region; and senses an object in the blind spot region on the basis of a reflected signal reflected by the other moving body, in the result of the detection by the detection unit.

15 Claims, 17 Drawing Sheets

(51) Int. Cl.
*G01S 13/931* (2020.01)
*G06T 7/521* (2017.01)
*G08G 1/16* (2006.01)

(52) U.S. Cl.
CPC . *B60W 2420/403* (2013.01); *B60W 2420/408* (2024.01); *B60W 2554/4041* (2020.02); *B60W 2554/802* (2020.02); *G01S 2013/9315* (2020.01); *G01S 2013/9323* (2020.01); *G01S 2013/9324* (2020.01); *G06T 2207/10028* (2013.01); *G06T 2207/30261* (2013.01)

(58) Field of Classification Search
CPC . B60W 2554/802; B60Q 9/008; G08G 1/167; G01S 2013/9315; G01S 2013/9323; G01S 2013/9324; G06T 7/521; G06T 2207/10028; G06T 2207/30261
USPC .......................................................... 701/96
See application file for complete search history.

(56) References Cited

U.S. PATENT DOCUMENTS

| | | | |
|---|---|---|---|
| 2012/0059789 A1 | 3/2012 | Sakai et al. | |
| 2013/0194127 A1 | 8/2013 | Ishihara et al. | |
| 2013/0223686 A1 | 8/2013 | Shimizu et al. | |
| 2014/0288814 A1* | 9/2014 | Schoenherr | G01S 15/931 |
| | | | 701/301 |
| 2015/0353078 A1* | 12/2015 | Kaminade | B60W 30/0956 |
| | | | 701/1 |
| 2016/0039411 A1* | 2/2016 | Park | G01S 13/931 |
| | | | 701/70 |
| 2016/0154099 A1* | 6/2016 | Saito | G01S 7/412 |
| | | | 342/28 |
| 2017/0032675 A1 | 2/2017 | Sakai et al. | |
| 2018/0222387 A1* | 8/2018 | Wu | B60R 13/10 |
| 2018/0233049 A1* | 8/2018 | Ishii | G08G 1/162 |
| 2020/0189467 A1 | 6/2020 | Kondo et al. | |

FOREIGN PATENT DOCUMENTS

| | | |
|---|---|---|
| JP | 2011242860 A | 12/2011 |
| JP | 2013156794 A | 8/2013 |
| JP | 2015230566 A | 12/2015 |
| JP | 2018101295 A | 6/2018 |
| WO | 2012033173 A1 | 3/2012 |
| WO | 2019008716 A1 | 1/2019 |
| WO | 2019044185 A1 | 3/2019 |

OTHER PUBLICATIONS

PCT Written Opinion of the International Searching Authority for International Application No. PCT/JP2019/009942; Date of Mailing, Jun. 18, 2019.
EPO Extended European Search Report for corresponding EP Application No. 19868850.9;Issued on Mar. 7, 2022.

* cited by examiner

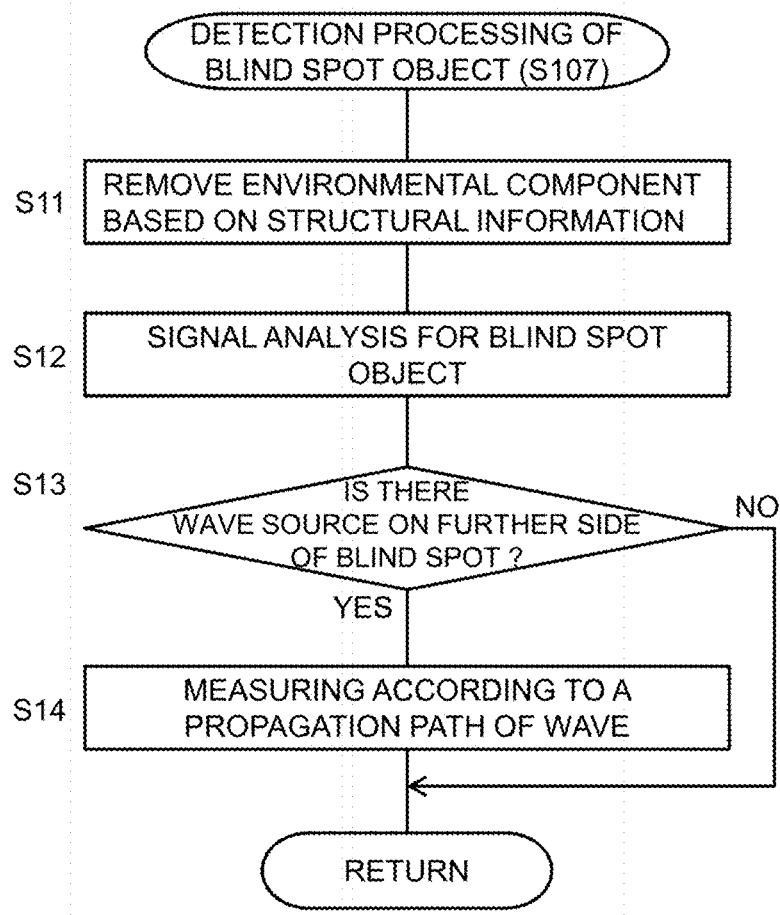

SENSING DEVICE, MOVING BODY SYSTEM AND SENSING METHOD

CROSS REFERENCE TO RELATED APPLICATIONS

This is the U.S. national stage of application No. PCT/JP2019/009942, filed on Mar. 12, 2019. Priority under 35 U.S.C. § 119(a) and 35 U.S.C. § 365(b) is claimed from Japanese Application No. 2018-190260, filed Oct. 5, 2018, the disclosure of which is also incorporated herein by reference.

TECHNICAL FIELD

The present disclosure relates to a sensing device that detects a peripheral object from a moving body, a moving body system including the sensing device, and a sensing method.

BACKGROUND ART

A technique that is mounted on a moving body such as an automobile or an automated guided vehicle (AGV) for monitoring the periphery of the moving body has been proposed (see, for example JP 2011-242860 A and JP 2010-267211 A).

JP 2011-242860 A discloses an obstacle recognition device that recognizes an obstacle in front of an own vehicle. The obstacle recognition device of JP 2011-242860 A includes a camera and a radar, detects a blind spot region for an own vehicle, and estimates the attribute of an obstacle that may exist in the blind spot region based on the size of the detected blind spot region. The obstacle recognition device causes the camera to search the blind spot region when it is estimated that the attribute of the obstacle that may exist in the blind spot region is a pedestrian, and causes the radar to search the blind spot region when it is estimated that the attribute of the obstacle is another vehicle.

JP 2010-267211 A discloses a vehicle environment estimation device for the purpose of accurately estimating a traveling environment around an own vehicle. The vehicle environment estimation device of JP 2010-267211 A detects the behavior of other vehicles around the own vehicle, and estimates, based on the behavior of the vehicles, the existence of another vehicle traveling in a blind spot region from the own vehicle. In this way, a vehicle traveling environment that cannot be recognized by the own vehicle and can be recognized by other vehicles on the periphery is estimated.

SUMMARY OF THE INVENTION

Problems to be Solved by the Invention

JP 2011-242860 A estimates whether an obstacle that may exist in the detected blind spot region is a pedestrian or a vehicle based on the existence probability preset in association with the size of the blind spot region. According to the prior arts such as JP 2011-242860 A and JP 2010-267211 A, it has been difficult to detect an object existing in a blind spot in the surrounding environment from a moving body.

An object of the present disclosure is to provide a sensing device, a sensing method, and a moving body system capable of detecting an object existing in a blind spot in a surrounding environment from a moving body.

Means for Solving the Problems

A sensing device according to an embodiment of the present disclosure detects an object existing in a blind spot in a surrounding environment of a moving body. The sensing device includes a detection unit, a distance measuring unit, and a control unit. The detection unit radiates a physical signal from the moving body to the surrounding environment and detects a reflected signal of the radiated physical signal. The distance measuring unit detects distance information indicating a distance from the moving body to the surrounding environment. The control unit analyzes a detection result made by the detection unit. The control unit detects a blind spot region indicating a blind spot in the surrounding environment and another moving body traveling toward the blind spot region in front of the moving body based on the distance information, and then detects an object in the blind spot region based on the reflected signal reflected by the other moving body in a detection result of the detection unit.

A moving body system according to another embodiment of the present disclosure includes the sensing device according to the above embodiment of the present disclosure, and a control device that controls the moving body based on a detection result of the sensing device.

A sensing method according to yet another embodiment of the present disclosure is to detect an object existing in a blind spot in a surrounding environment of a moving body. The sensing method includes the steps of a distance measuring unit detecting distance information indicating a distance from the moving body to the surrounding environment, and of a control unit detecting a blind spot region indicating a blind spot in the surrounding environment based on the distance information. The sensing method further includes the step of a control unit detecting another moving body traveling toward the blind spot region in front of the moving body. The sensing method further includes the step of a detection unit radiating a physical signal from the moving body to the surrounding environment and detecting a reflected signal of the radiated physical signal. The sensing method further includes the step of the control unit detecting an object in the blind spot region based on the reflected signal reflected by the other moving body in a detection result of the detection unit.

Effects of the Invention

According to the sensing device, the moving body system, and the sensing method of the present disclosure can detect an object existing in a blind spot in a surrounding environment from a moving body.

BRIEF DESCRIPTION OF THE DRAWINGS

FIG. 9 is a flowchart exemplifying the detection processing of a blind spot object by the sensing device.

MODES FOR CARRYING OUT THE INVENTION

Figure 1:
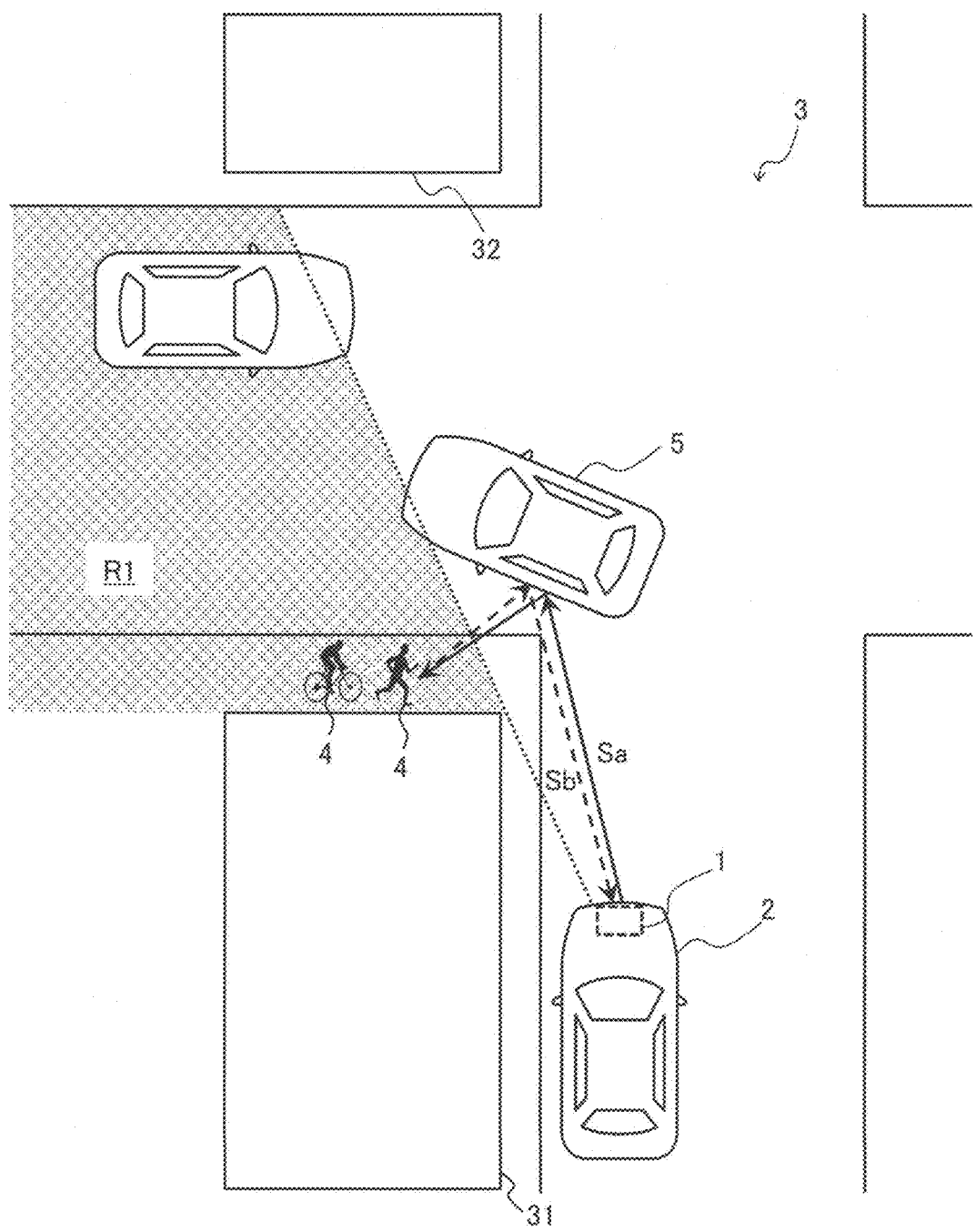
FIG. 1 is a diagram for describing an application example of a sensing device according to the present disclosure.

Hereinafter, embodiments of the sensing device and method, and the moving body system according to the present disclosure will be described with reference to the accompanying drawings. Note that, in each of the embodiments below, the same reference numerals are given to the same constituents.

Application Example

An example to which the sensing device and method, and the moving body system according to the present disclosure can be applied will be described with reference to FIG. 1. FIG. 1 is a diagram for describing an application example of the sensing device 1 according to the present disclosure.

The sensing device 1 according to the present disclosure can be applied to, for example, in-vehicle use, and constitutes a moving body system in a moving body such as an automobile. FIG. 1 exemplifies a traveling state of a vehicle 2 on which the sensing device 1 is mounted. The moving body system according to the present application example uses, for example, the sensing device 1 to monitor the surrounding environment that changes around the own vehicle 2 that is traveling. The surrounding environment includes, for example, structures such as a building and a utility pole existing around the own vehicle 2, and various objects such as moving objects such as a pedestrian and another vehicle.

In the example of FIG. 1, a wall 31 of a structure near an intersection 3 blocks a range that can be monitored from the own vehicle 2, and a blind spot is created. The blind spot indicates a place that cannot be seen directly geometrically depending on the surrounding environment from a moving body such as the own vehicle 2. In the present example, in a blind spot region R1 which is a region of a blind spot from the own vehicle 2, there is a passerby 4 who is moving toward a location of a moving destination of the own vehicle 2.

In the above case, there is a concern for a situation where the passerby 4 from a blind spot and the own vehicle 2 may collide with each other at the crossing. Here, with a conventional peripheral monitoring technique using a camera, radar or the like, while a blind spot from the own vehicle 2 has been detected, it has been difficult to detect the passerby 4 or the like approaching the own vehicle 2 in the blind spot region R1.

In contrast, the sensing device 1 radiates a signal Sa physically used by radar or the like and detects a signal Sb indicating a reflected wave of the signal Sa so as to execute detection of an object (hereinafter sometimes referred to as a "blind spot object") existing in the blind spot region R1 like the passerby 4.

Further, the sensing device 1 executes detection of another vehicle 5 traveling in front of the own vehicle 2 toward the blind spot region R1. When detecting the other vehicle 5, the sensing device 1 irradiates the other vehicle 5 with the physical signal Sa. The physical signal Sa is reflected by the body of the other vehicle 5, reaches the blind spot object 4, and is further reflected by the blind spot object 4. This reflected wave reaches the body of the other vehicle 5 and is further reflected. The sensing device 1 receives the multiple reflected wave Sb reflected by the other vehicle 5, and detects the blind spot object 4 in the blind spot region R1 based on the multiple reflected wave Sb.

According to the sensing device 1, a risk level of the intersection 3 and the like is determined based on a detection result of the blind spot object 4, and a determination result is reflected to various types of control for driving support, driving control, and the like in the own vehicle 2, so that a crossing collision and the like can be avoided.

Configuration Example

Hereinafter, embodiments as a configuration example of the moving body system including the sensing device 1 will be described.

First Embodiment

A configuration and operation of the moving body system according to the first embodiment will be described below.

1. Configuration

Figure 2:
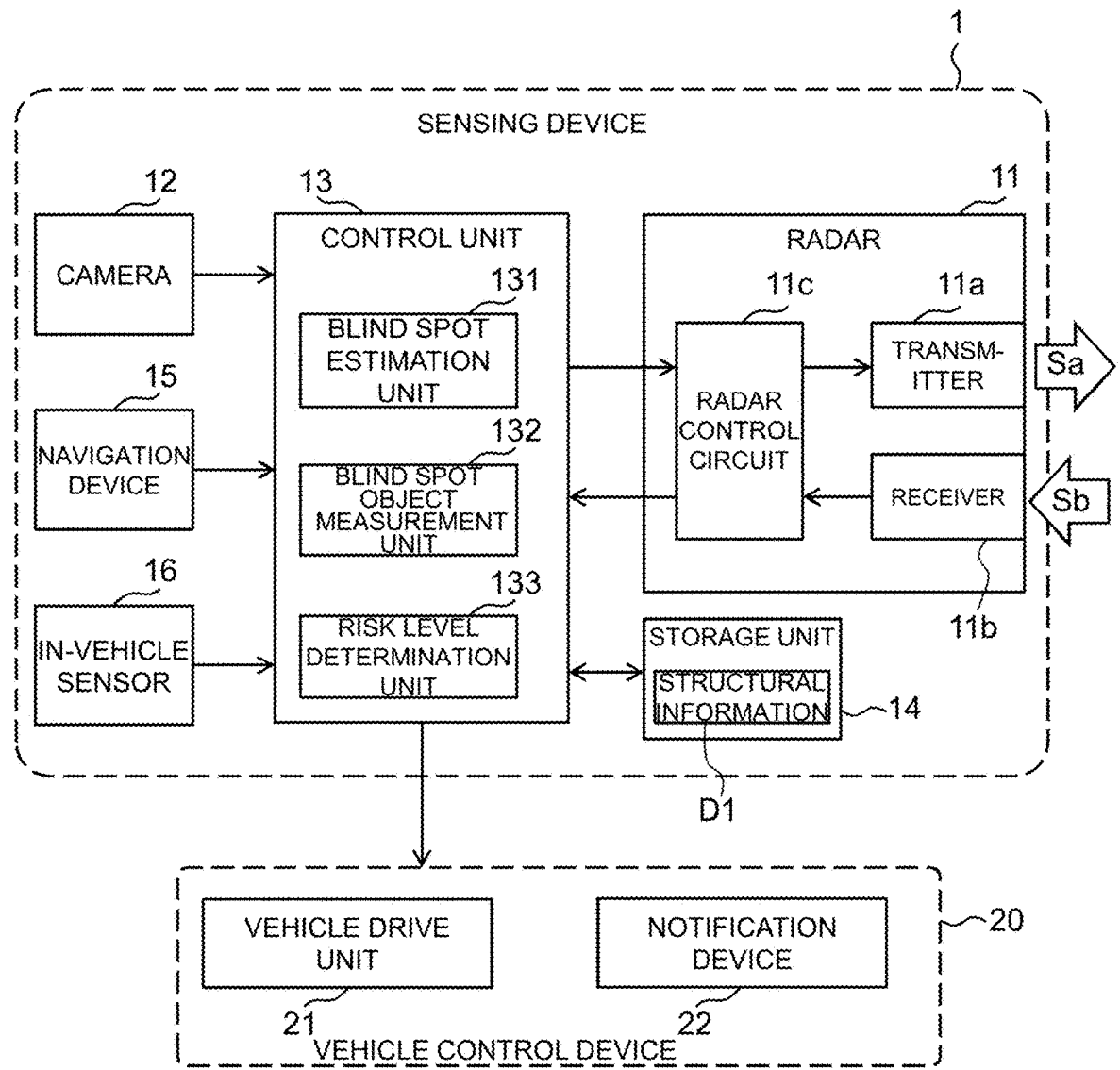
FIG. 2 is a block diagram exemplifying a configuration of a moving body system according to a first embodiment of the present disclosure.

The configuration of the moving body system according to the first embodiment will be described with reference to FIG. 2. FIG. 2 is a block diagram exemplifying the configuration of the present system.

As exemplified in FIG. 2, the present system includes the sensing device 1 and a vehicle control device 20. The sensing device 1 of the first embodiment includes a radar 11, a camera 12, and a control unit 13. Further, for example, the sensing device 1 includes a storage unit 14, a navigation device 15, and an in-vehicle sensor 16. The vehicle control device 20 includes various in-vehicle devices mounted on the own vehicle 2, and is used for, for example, driving support or automatic driving.

In the sensing device 1, the radar 11 includes, for example, a transmitter 11a, a receiver 11b, and a radar control circuit 11c. The radar 11 is an example of a detection unit in the first embodiment. The radar 11 is installed on the front grill, the windshield, or the like of the own vehicle 2 so as to transmit and receive a signal toward the front (see FIG. 1) in the traveling direction of the own vehicle 2, for example.

The transmitter 11a includes, for example, an antenna having variable directivity (phased array antenna or the like), a transmission circuit for causing the antenna to transmit the physical signal Sa to the outside, and the like. The physical signal Sa includes, for example, at least one of a millimeter wave, a microwave, a radio wave, and a terahertz wave.

The receiver 11b includes, for example, an antenna having variable directivity, a receiving circuit for receiving the wave signal Sb from the outside by the antenna, and the like. The wave signal Sb is set in the same wavelength band as the physical signal Sa so as to include the reflected wave of the physical signal S a. Note that the transmitter 11a and the receiver 11b may, for example, use a shared antenna or may be integrally configured.

The radar control circuit 11c controls the transmission and receiving of a signal by the transmitter 11a and the receiver 11b. The radar control circuit 11c starts transmission and receiving of a signal by the radar 11 or controls the direction in which the physical signal Sa is radiated from the transmitter 11a, for example, by a control signal from the control unit 13. Further, the radar control circuit 11c radiates the physical signal Sa from the transmitter 11a to the surrounding environment, and detects the wave signal Sb indicating the reflected wave of the physical signal Sa in a receiving result of the receiver 11b.

The radar 11 operates according to a modulation system such as a continuous wave (CW) system or a pulse system, and measures the distance, direction, speed, and the like of an external object. The CW system includes a two-wave CW system, an FM-CW system, a spread spectrum system, and the like. The pulse system may be a pulse-Doppler system, or may use pulse compression of a chirp signal or pulse compression of a PN sequence. The radar 11 uses, for example, coherent phase information control. The radar 11 may use an incoherent system.

The camera 12 is installed at a position where, for example, a range superimposed on a range in which the physical signal S a can be radiated from the radar 11 in the own vehicle 2 can be imaged. For example, the camera 12 is installed on the windshield or the like of the own vehicle 2 in a manner facing the front of the own vehicle 2 (see FIG. 1). For a blind spot in the sensing device 1, the installation position of the camera 12 may be used as a geometrical reference or the installation position of the radar 11 may be used as a reference.

The camera 12 captures an external image from the installation position and generates a captured image. The camera 12 outputs image data indicating the captured image to the control unit 13. The camera 12 is, for example, an RGB-D camera, a stereo camera, or a distance image sensor. The camera 12 is an example of a distance measuring unit in the first embodiment.

The control unit 13 includes a CPU, a RAM, a ROM, and the like, and controls each constituent according to information processing. The control unit 13 is composed of, for example, an electronic control unit (ECU). The control unit 13 loads a program stored in the storage unit 14 into a RAM, and the CPU interprets and executes the program loaded into the RAM. As a software module realized in this way, for example, the control unit 13 realizes a blind spot estimation unit 131, a blind spot object measurement unit 132, and a risk level determination unit 133. Each of the units 131 to 133 will be described later.

The storage unit 14 stores a program executed by the control unit 13, various types of data, and the like. For example, the storage unit 14 stores structural information D1 described later. The storage unit 14 includes, for example, a hard disk drive or a solid state drive. Further, the RAM and the ROM may be included in the storage unit 14.

The above programs and the like may be stored in a portable storage medium. The storage medium is a medium that stores information of a program and the like in which a computer, other devices and machines, and the like are recorded by an electrical, magnetic, optical, mechanical, or chemical action so that the information of the program and the like can be read. The sensing device 1 may acquire the program and the like from the storage medium.

The navigation device 15 is an example of a distance measuring unit including, for example, a memory for storing map information and a GPS receiver. The in-vehicle sensor 16 is various sensors mounted on the own vehicle 2, and includes, for example, a vehicle speed sensor, an acceleration sensor, a gyro sensor, and the like. The in-vehicle sensor 16 detects the speed, acceleration, angular velocity, and the like of the own vehicle 2.

The above configuration is an example, and the sensing device 1 is not limited to the above configuration. For example, the sensing device 1 does not have to include the navigation device 15 or the in-vehicle sensor 16. Further, the control unit 13 of the sensing device 1 may be composed of a plurality of hardware resources that separately execute each of the above units 131 to 133. The control unit 13 may be composed of various semiconductor integrated circuits such as a CPU, an MPU, a GPU, a microcomputer, a DSP, an FPGA, and an ASIC.

The vehicle control device 20 is an example of a control device of the moving body system according to the first embodiment. The vehicle control device 20 includes, for example, a vehicle drive unit 21 and a notification device 22. The vehicle drive unit 21 is composed of, for example, an ECU, and drives and controls each unit of the own vehicle 2. For example, the vehicle drive unit 21 controls the brake of the own vehicle 2 to realize automatic braking.

The notification device 22 notifies the user of various types of information by means of an image, a sound, or the like. The notification device 22 is, for example, a display device such as a liquid crystal panel or an organic EL panel mounted on the own vehicle 2. The notification device 22 may be a voice output device that outputs an alarm or the like by voice.

2. Operation 2-1. Outline

The operation of the moving body system and the sensing device 1 configured as described above will be described below.

The moving body system according to the first embodiment operates the sensing device 1 so as to monitor the surrounding environment, for example, while the own vehicle 2 is driven. The vehicle control device 20 of the present system performs various types of control for driving support, automatic driving, or the like of the own vehicle 2 based on the detection result made by the sensing device 1.

The sensing device 1 of the first embodiment, for example, captures an image around the own vehicle 2 with the camera 12 and monitors the surrounding environment of the own vehicle 2. The blind spot estimation unit 131 of the sensing device 1 sequentially detects the presence or absence of a region where a blind spot is estimated in the current surrounding environment, based on, for example, distance information indicating various distances in the monitoring result and the like.

In the sensing device 1, when the blind spot estimation unit 131 finds a blind spot, the blind spot object measurement unit 132 measures an internal state of the blind spot region R1 using the radar 11. It is considered that the physical signal Sa radiated from the radar 11 of the own vehicle 2, which has a wave-like property, may generate the propagation in which the physical signal Sa causes multiple reflections, diffractions, or the like to reach the blind spot object 4 in the blind spot region R1, and further returns to the own vehicle 2. The sensing method of the first embodiment detects the blind spot object 4 by utilizing a wave propagating as described above.

Further, in a case where the sensing device 1 uses the blind spot estimation unit 131 to find a blind spot, and the other vehicle 5 traveling toward the blind spot region R1 in front of the own vehicle 2 is detected, the blind spot object measurement unit 132 uses the radar 11 to irradiate the other vehicle 5 with the physical signal Sa. The physical signal Sa is reflected by the body of the other vehicle 5, reaches the blind spot object 4, and is further reflected by the blind spot object 4. This reflected wave reaches the body of the other vehicle 5 and is further reflected. The blind spot object measurement unit 132 receives the multiple reflected wave Sb reflected by the other vehicle 5, and detects the blind spot object 4 in the blind spot region R1 based on the multiple reflected wave Sb.

The risk level determination unit 133 determines a risk level of the blind spot object 4 that may exist in the blind spot region R1 based on a measurement result of the blind spot object measurement unit 132. The risk level relates to the possibility that, for example, the blind spot object 4 and the own vehicle 2 collide with each other or the like.

For example, when the sensing device 1 determines a risk level that is considered to require a warning, the present system can notify the driver or the like by the notification device 22 or execute vehicle control for enhancing the safety such as automatic braking by the vehicle drive unit 21. The details of the operation of the sensing device 1 in the present system will be described below.

2-2. Operation of Sensing Device 2-2-1. Blind Spot Region and Detection of Presence or Absence of Another Vehicle Entering Blind Spot Region The operation of the sensing device 1 according to the first embodiment will be described with reference to FIG. 3 to FIG. 6.

Figure 3:
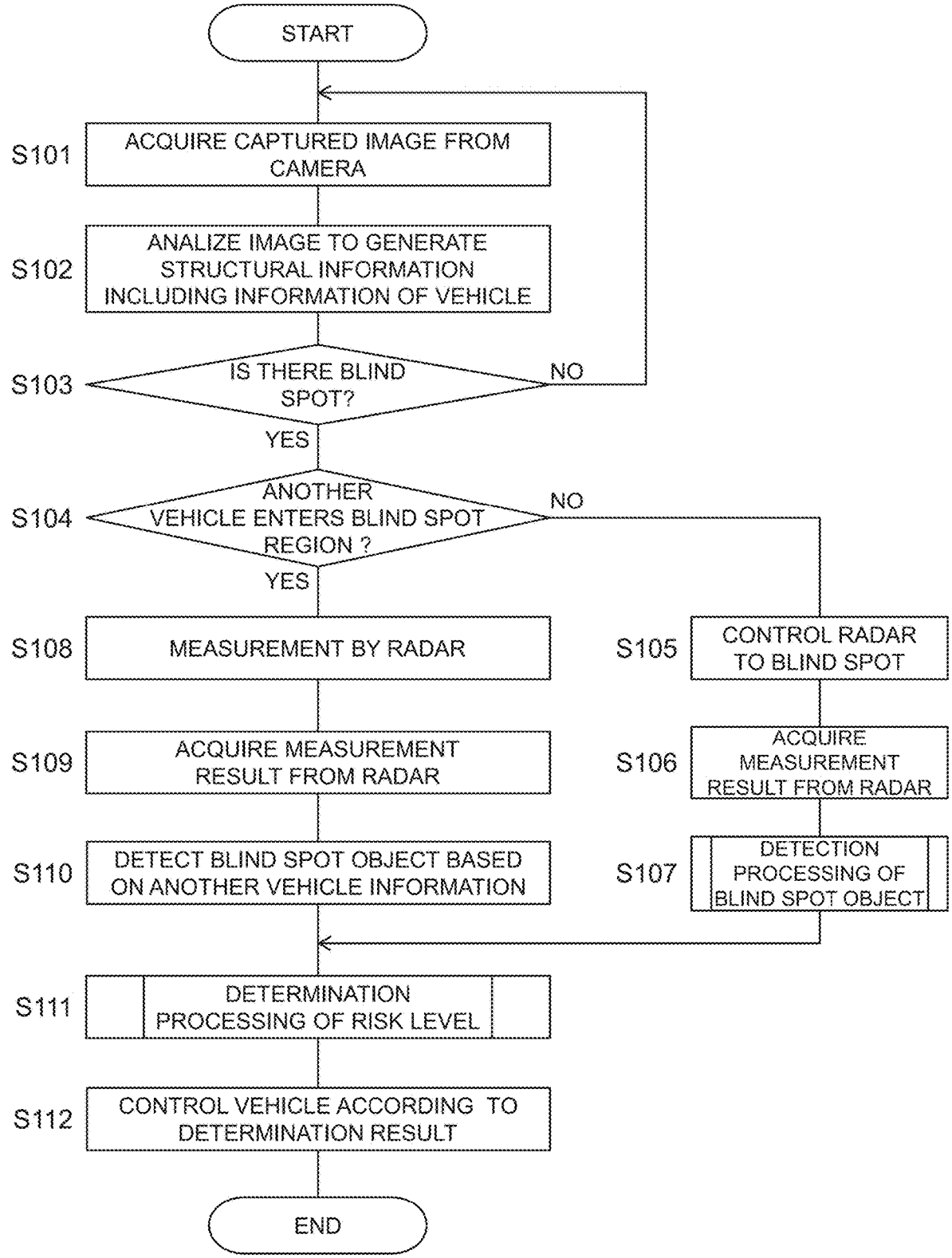
FIG. 3 is a flowchart for describing operation of the sensing device according to the first embodiment.

FIG. 3 is a flowchart for describing the operation of the sensing device 1 according to the first embodiment. Each piece of processing shown in the flowchart of FIG. 3 is executed by the control unit 13 of the sensing device 1. The present flowchart is started at a predetermined cycle, for example, while the own vehicle 2 is driven.

First, the control unit 13 acquires a captured image of one or a plurality of frames from the camera 12 (S101). In step S101, the control unit 13 may acquire a distance image as the captured image, or may generate a distance image based on the acquired captured image. The distance image is an example of distance information indicating various distances for monitoring the surrounding environment.

Figure 4:
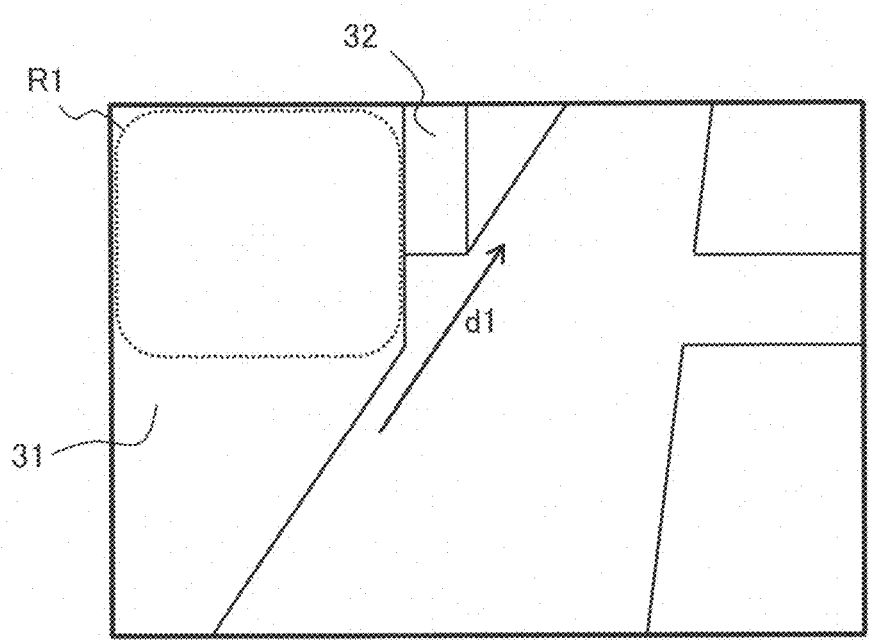
FIG. 4 is a diagram for describing an example of distance information in the sensing device.

Next, the control unit 13 performs image analysis on the acquired captured image (S102) to generate the structural information D1 regarding the current surrounding environment of the own vehicle 2. The structural information D1 is information indicating various object structures in the surrounding environment, and includes, for example, distances to various structures. The structural information D1 includes information on the other vehicle 5 in front of the own vehicle 2. Further, the control unit 13 also operates as the blind spot estimation unit 131 in step S102, and also performs image analysis for detecting a blind spot in the acquired captured image. FIG. 4 exemplifies an image to be analyzed in step S102.

In FIG. 4, for example, an image is captured from the own vehicle 2 as a distance image (S101), and the image shows walls 31 and 32 formed by a plurality of structures in the vicinity of the intersection 3. In the present example, the blind spot region R1 exists on the back side of the wall 31 due to shielding by the wall 31 in the vicinity of the own vehicle 2. Further, the wall 32 on the back side of the blind spot region R1 faces the own vehicle 2. Hereinafter, the wall 31 is referred to as a "shielding wall", and the wall 32 is referred to as a "facing wall". A boundary between the blind spot region R1 and the outside is formed between the shielding wall 31 and the facing wall 32 (see FIG. 1).

In step S102, for example, the control unit 13 extracts distance values of the various walls 31 and 32 in the distance image as structural information D1 for each pixel and holds them in the storage unit 14. The distance value in the case of FIG. 4 changes continuously from the side of the own vehicle 2 for the size of the shielding wall 31 along a direction dl, and changes discontinuously from an end portion of the shielding wall 31 to the facing wall 32. The control unit 13 can estimate the existence of the blind spot region R1 by analyzing the change in the distance value as described above.

Returning to FIG. 3, the control unit 13 as the blind spot estimation unit 131 determines whether or not the blind spot region R1 is detected in the current surrounding environment of the own vehicle 2 for example, according to an estimation result by image analysis (S103). When determining that the blind spot region R1 is not detected (NO in S103), for example, the control unit 13 periodically repeats the processing of steps S101 to S103.

When the blind spot region R1 is determined to be detected in step S103 (YES in S103), the control unit 13 determines, for example, whether or not a vehicle traveling in the same direction as the own vehicle 2 in front of the own vehicle 2 is about to enter the blind spot region R1 by changing the traveling direction to the direction of the blind spot region R1 according to an estimation result by image analysis (S104).

2-2-2. Case where Another Vehicle in Front Entering Blind Spot Region is not Present In step S104, in a case where the vehicle traveling in the same direction as the own vehicle 2 in front of the own vehicle 2 is determined not to be in a state of being about to enter the blind spot region R1 by changing the traveling direction to the direction of the blind spot region R1 (NO in step S104), the control unit 13 executes processing as the blind spot object measurement unit 132 (S105 to S107). In the first and subsequent embodiments, a processing example of the blind spot object measurement unit 132 that measures the blind spot object 4 in the blind spot region R1 will be described by utilizing the multiple reflected wave in the wave signal Sb of the radar 11.

Figure 5A:
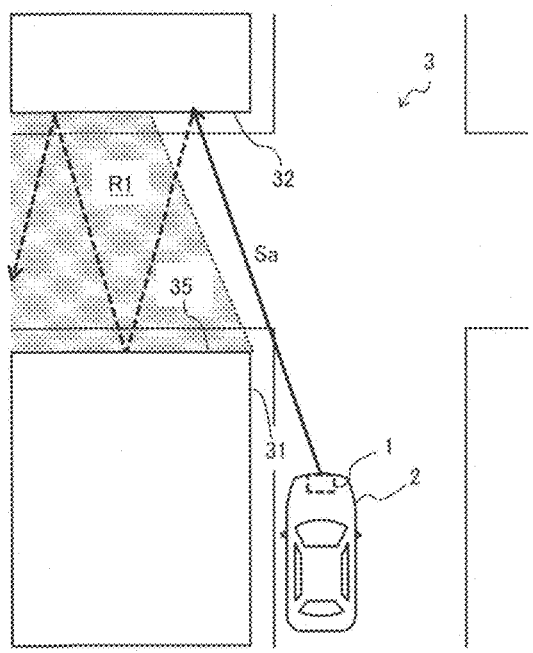
FIG. 5A-FIG. 5B are diagrams for describing the operation of the sensing device according to the first embodiment.
Figure 5B:
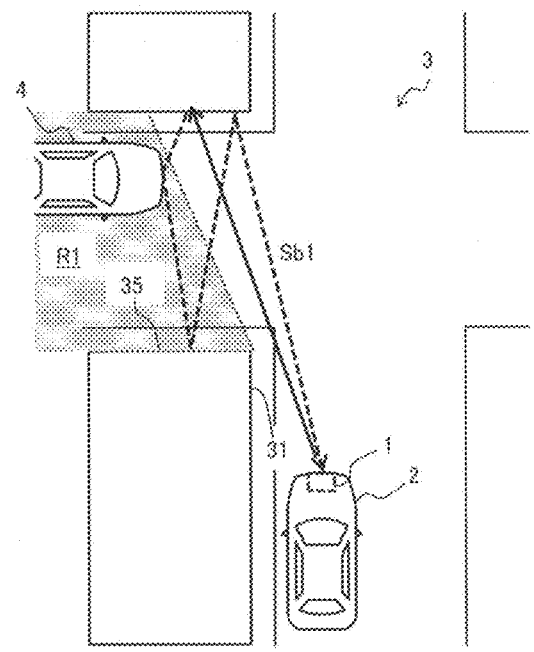

The control unit 13 as the blind spot object measurement unit 132 first controls the radar 11 so as to radiate the physical signal Sa toward the blind spot region R1 (S105). FIG. 5(A) and FIG. 5(B) exemplify a propagation path of the physical signal Sa in step S105 in cases where there is and there is not the blind spot object 4, respectively.

In step S105, the control unit 13 radiates the physical signal Sa from the radar 11 to the facing wall 32 in the vicinity of the boundary of the blind spot region R1, for example, based on the analysis result of FIG. 4. In the example of FIG. 5A the physical signal Sa from the radar 11 of the own vehicle 2 is repeatedly reflected between the facing wall 32 and a wall 35 on the opposite side via the blind spot region R1 of a side road, and propagates as a multiple reflected wave. In the example of FIG. 5A, the multiple reflected wave does not come toward the own vehicle 2 corresponding to the absence of the blind spot object 4.

In contrast, in the example of FIG. 5B, since the blind spot object 4 exists, the physical signal Sa from the radar 11 is reflected by the blind spot object 4 in addition to the walls 32 and 33, respectively, and becomes a multiple reflected wave Sb1 directed toward the own vehicle 2. Therefore, the wave signal Sb received by the radar 11 includes a signal component of the multiple reflected wave Sb1 having the information of the blind spot object 4.

In step S105, the radar 11 radiates the physical signal Sa and receives the wave signal Sb to perform various types of measurement based on the reflected wave of the physical signal Sa. The control unit 13 acquires a measurement result from the radar 11 (S106).

The control unit 13 performs detection processing of a blind spot object based on a measurement result of the radar 11 (S107). A signal component of the multiple reflected wave Sb1 (FIG. 5B) has information according to the speed of the blind spot object 4 as a reflection source and the length of the propagation path by the Doppler shift, the phase, and the propagation time. The detection processing of a blind spot object (S107) detects the speed, position, and the like of the blind spot object 4 that reflects the multiple reflected wave Sb1 by analyzing such a signal component. The details of the processing of step S107 will be described later.

Next, the control unit 13 operates as the risk level determination unit 133, and performs determination processing of a risk level (S111) based on the detection result of the blind spot object 4 (S107). In the determination processing of a risk level, for example, whether a warning is required or not is determined according to a risk level of the blind spot object 4 approaching the own vehicle 2 based on the detected position and speed. In a case where information of the movement, distance, type, shape, and the like of the blind spot object 4 is detected in step S107, the risk level may be determined using such information in step S111. The details of the processing in step S111 will be described later.

Next, the control unit 13 outputs various control signals to the vehicle control device 20 (S112) according to the determination result of a risk level (S111). For example, in a case where it is determined in step S111 that a warning is required, the control unit 13 generates a control signal for causing the notification device 22 to notify the warning or controlling the vehicle drive unit 21.

When, for example, outputting a control signal (S112), the control unit 13 ends the processing shown in the flowchart of FIG. 3.

According to the above processing, the sensing device 1 detects the blind spot object 4 (S107) when a blind spot is found (YES in S103) while performing peripheral monitoring of the own vehicle 2 (S101 to S103), and can perform various actions (S112).

Figure 6:
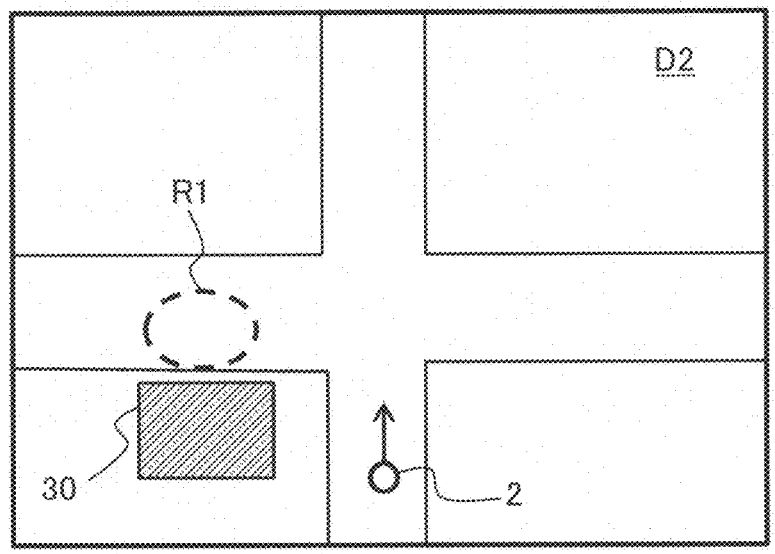
FIG. 6 is a diagram for describing a variation of the distance information in the sensing device.

In the above processing, the camera 12 is used for the peripheral monitoring. However, the navigation device 15 may be used. The present variation is shown in FIG. 6. As shown in FIG. 6, the navigation device 15 calculates various distances to the own vehicle 2 in map information D2 of the surrounding environment of the own vehicle 2 and monitors the current position of the own vehicle 2. The control unit 13 can use the monitoring result of the navigation device 15 as described above for various types of processing shown in FIG. 3. The control unit 13 can acquire the structural information D1 and detect the blind spot region R1 based on the monitoring result of the navigation device 15, for example, based on a structure 30 in the map information D2 (S102). Further, the control unit 13 may appropriately use a detection result of the in-vehicle sensor 16 in the processing of FIG. 3.

The detection processing of a blind spot object (S107 in FIG. 3) will be described with reference to FIG. 7A to FIG. 9.

Figure 7A:
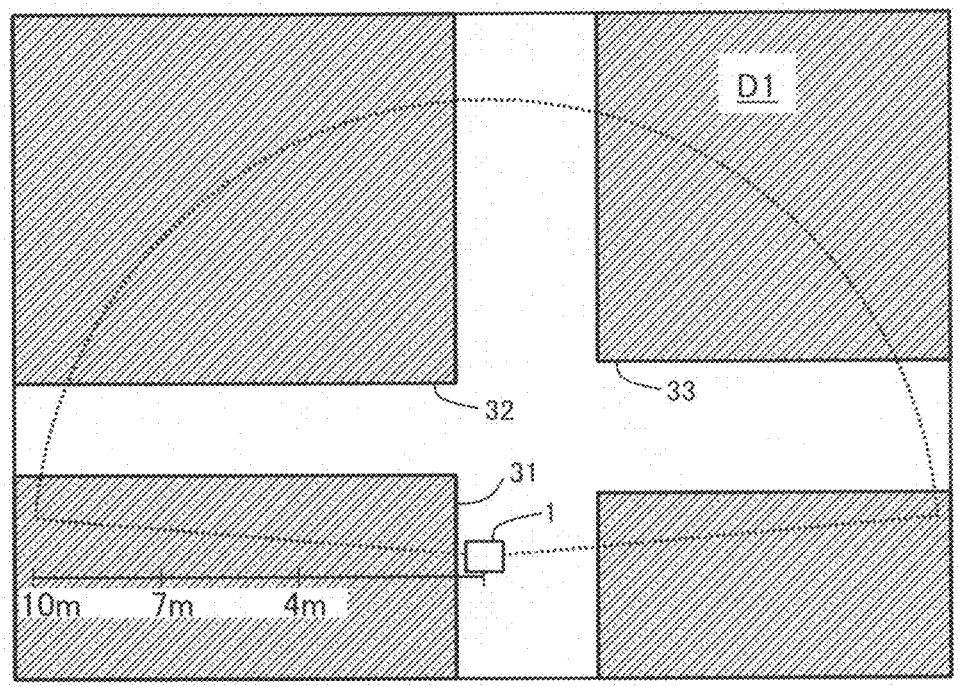
FIG. 7A-FIG. 7B are diagrams for describing an experiment of detection processing of a blind spot object.
Figure 7B:
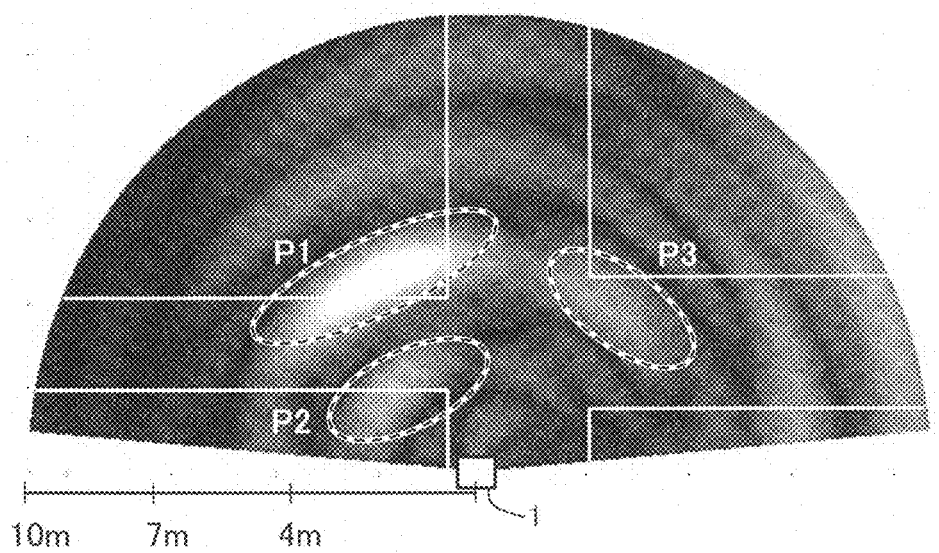
Figure 8A:
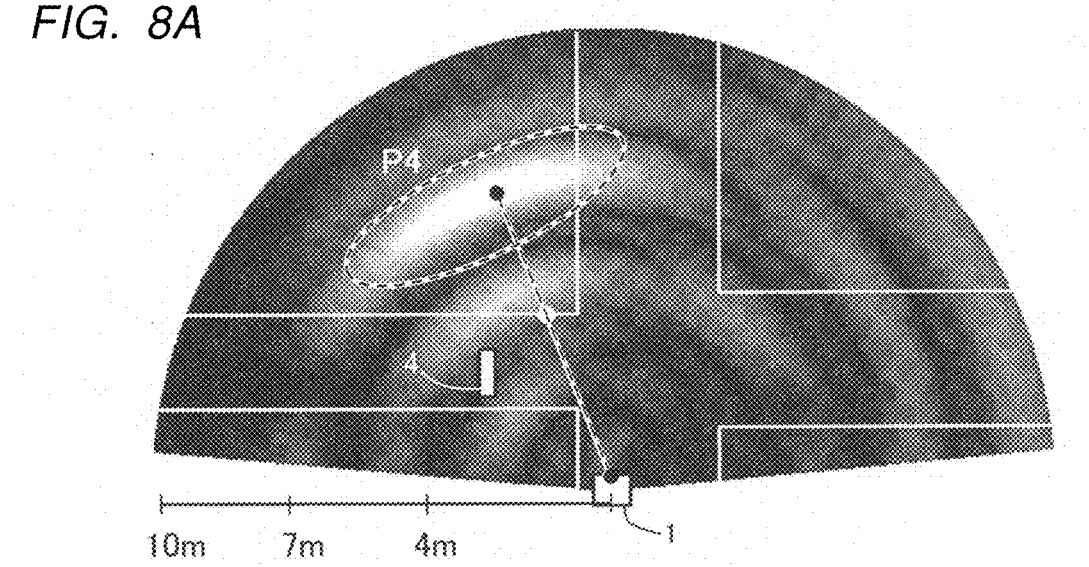
FIG. 8A-FIG. 8B are diagrams exemplifying a case where there is a blind spot object in the experiment of FIG. 7A-FIG. 7B.
Figure 8B:
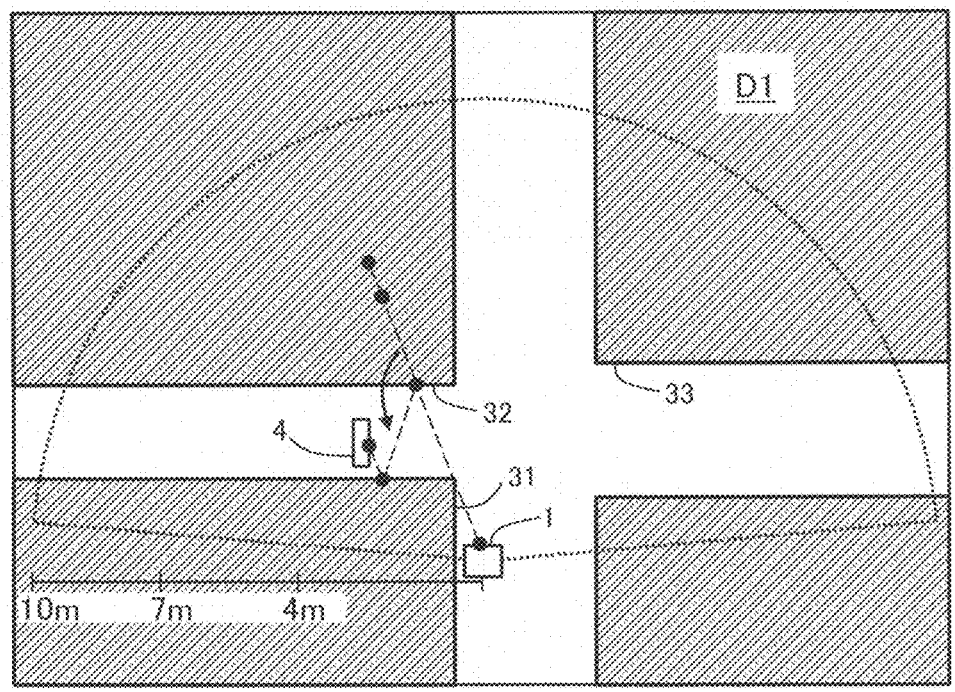

FIG. 7A-FIG. 7B are diagrams for describing an experiment of the detection processing of a blind spot object. FIG. 7A illustrates the structural information D1 of an experimental environment of the present experiment. FIG. 7B illustrates a measurement result of the radar 11 in a case where the blind spot object 4 is absent. FIG. 8A-FIG. 8B are diagrams exemplifying a case where there is a blind spot object in the experiment of FIG. 7A-FIG. 7B. FIG. 8A illustrates a measurement result of the radar 11 in a case where the blind spot object 4 is present. FIG. 8B exemplifies a propagation path of a multiple reflected wave estimated from the blind spot object 4.

The present experiment was performed in a passage with an intersection, as shown in FIG. 7A. The shades in FIG. 7B and FIG. 7A indicate that the lighter the shade, the stronger the signal strength obtained by the radar 11.

In the present experiment, in the state where the blind spot object 4 is absent, a strong peak P1 was confirmed near 4 m as shown in FIG. 7B. The peak P1 shows a reflected wave from the facing wall P1 facing the radar 11. Further, in FIG. 7B, peaks P2 and P3 due to reflected waves from the other walls 32 and 33 can be confirmed, respectively.

In contrast, in a state where the blind spot object 4 was placed, a strong peak P4 appeared near 7 m farther than the facing wall 32, as shown in FIG. 8A. The direction of the peak P4 can be seen on the back side of the facing wall 32 from the radar 11. From the above distance and direction, it can be seen that the peak P4 is mainly composed of a component reflected from the blind spot object 4 through the reflection by the facing wall 32 (see FIG. 8B). That is, it was confirmed that the peak P4 with the blind spot object 4 as a wave source can be detected based on the distance and the direction to the peak P4 in the measurement result of the radar 11.

In the analysis of a signal component of the blind spot object 4 as described above, the presence/absence, position, and the like of the blind spot object 4 can be detected more accurately by using the structural information of the surrounding environment. Hereinafter, an example of the detection processing of a blind spot object according to the first embodiment will be described with reference to FIG. 9.

FIG. 9 is a flowchart exemplifying the detection processing of a blind spot object according to the first embodiment. The processing according to the flowchart of FIG. 9 is executed by the control unit 13 that operates as the blind spot object measurement unit 132 in step S107 of FIG. 3.

First, the control unit 13 removes an environmental component showing a reflected wave from the surrounding environment from a signal of the measurement result of the radar 11 acquired in step S106 of FIG. 3 in order to extract a signal component to be analyzed of the blind spot object (S11). The processing of step S11 is performed using, for example, the structural information acquired in step S102.

For example, the peaks P1, P2, and P3 in the example of FIG. 7B can be estimated in advance as environmental components showing the reflected waves from the corresponding walls 31, 32, and 33 in the structural information D1 of the passage (FIG. 7B), respectively. The control unit 13 predicts reflected waves in various structures with reference to the structural information D1, and subtracts an environmental component of the prediction result from the measurement result (for example, FIG. 8A) of the radar 11 (S11). In this manner, the influence of a reflected wave by a structure under an environment such as a passage can be reduced, and only a signal component of an object in a blind spot can be easily emphasized.

Next, the control unit 13 performs signal analysis for detecting the blind spot object 4 based on the signal component obtained by removing the environmental component (S12). The signal analysis in step S12 may include various types of analysis such as frequency analysis, analysis on the time axis, spatial distribution, and signal strength.

Based on an analysis result of the signal analysis, the control unit 13 determines, for example, whether or not a wave source is observed on the further side of the facing wall 32 of a blind spot (S13), and, in this manner, detects the presence or absence of the blind spot object 4. For example, in the example of FIG. 8A, the peak P4 has a wave source on the back side of the passage further than the facing wall 32, and is at a position that is not predicted as an environmental component from the structure of the passage. From this, the peak P4 can be estimated to be caused by multiple reflections of a wave having a wave source in the blind spot. That is, the control unit 13 can determine that the blind spot object 4 is present in a case where a reflected wave is observed at a distance exceeding the facing wall 32 in the direction of a blind spot that has already been detected (YES in step S13).

In a case where the control unit 13 determines that a wave source is observed on the further side of the facing wall 32 of the blind spot (YES in S13), various state variables, such as the distance to the blind spot object 4 and speed, are measured according to a propagation path in which refraction due to multiple reflections is estimated (S14). For example, the control unit 13 uses information indicating a road width of the blind spot portion (width of the blind spot region R1) in the structural information D1 so as to be able to correct a path length to the blind spot object 4 that can be found from the signal component in a manner folding back the path as shown in FIG. 8B, and calculate the position of the blind spot object 4 that is closer to the actual position.

When performing measurement of the blind spot object 4 (S14), the control unit 13 ends the process of step S107 in FIG. 3. The control unit 13 then executes the determination processing of a risk level (S111 in FIG. 3) for the detected blind spot object 4.

Further, in a case of determining that no wave source is observed on the further side of the facing wall 32 of the blind spot (NO in S13), the control unit 13 ends the present processing without performing any particular measurement. In this case, the control unit 13 may omit the processing after step S111 in FIG. 3.

According to the above processing, the blind spot object 4 can be detected by using a signal component generated inside the blind spot region R1 based on the property of multiple reflections in the physical signal Sa of the radar 11.

Here, the signal component having the information of the blind spot object 4 is weak and is detected in the presence of a reflected wave from a visible object outside the blind spot. Accordingly, it is considered to be difficult to detect and estimate the signal component. Further, since the actual distance to the blind spot object 4 and the length of the propagation path of the signal are different, it is considered to be difficult to estimate the actual distance. In contrast, by using the structural information D1 of the surrounding environment, it is possible to narrow down the preconditions for analyzing a received wave (S11) and improve the estimation accuracy (S14).

For example, in step S11, the control unit 13 refers to a distance to the intersection in the vicinity of the blind spot in the structural information D1 and removes a signal component of a received wave obtained in the reciprocating propagation time of a signal with respect to a linear distance from the intersection, or less. Such a received wave, which is a directly reflected wave (that is, a wave with one reflection) and does not include information on the blind spot object 4, can be excluded from the object to be analyzed. Further, the control unit 13 can also separate a reflected wave arriving from the blind spot and a reflected wave arriving from another angle based on an azimuth angle of the blind spot seen from the own vehicle 2.

The processing of step S11 does not need to use the structural information D1 of the surrounding environment. For example, the control unit 13 may limit the object to be analyzed to a moving object by subtracting a position change of the own vehicle 2 from a signal obtained along the time axis. The present processing may be performed in the signal analysis in step S12.

In step S12 above, the control unit 13 may analyze whether or not there is a characteristic that appears due to the behavior of a specific object such as Doppler shift due to reflection on a moving object or fluctuation of the behavior peculiar to a person or a bicycle in the signal component to be analyzed. Further, the control unit 13 may analyze whether signal distribution of surface measurement having spatial expanse has distribution peculiar to an automobile, a bicycle, a person, or the like, includes reflection by an automobile-sized metal body based on reflection intensity, or the like. The above analysis may be performed in combination as appropriate, or may be performed as a multidimensional feature quantity using machine learning instead of explicitly analyzing each.

The determination processing of a risk level (S111 in FIG. 3) will be described with reference to FIG. 10 to FIG. 11.

Figure 10:
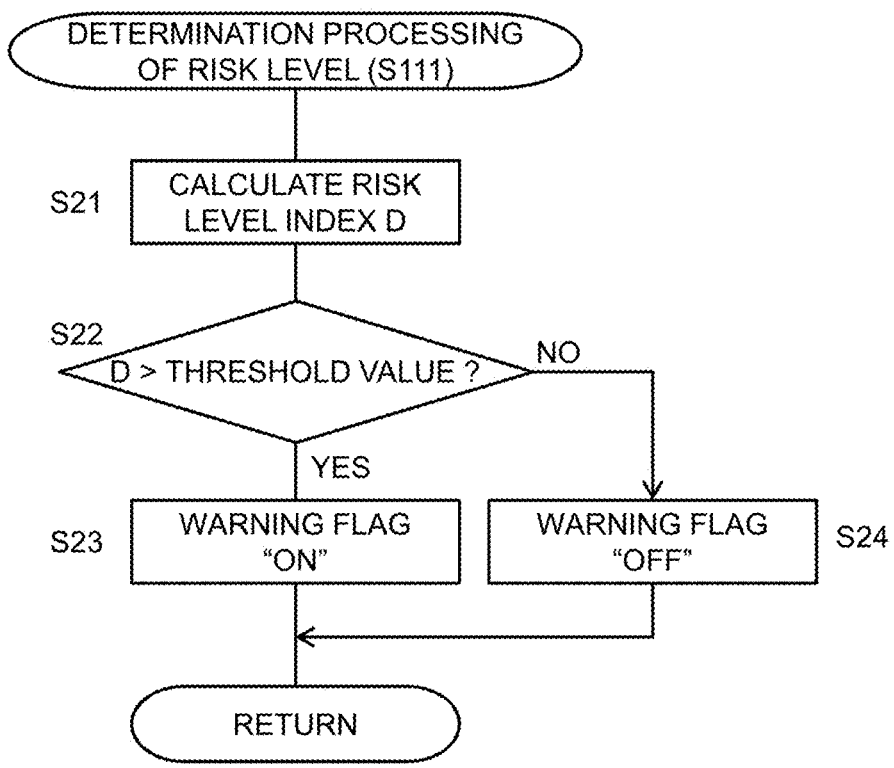
FIG. 10 is a flowchart exemplifying determination processing of a risk level by the sensing device.

FIG. 10 is a flowchart exemplifying the determination processing of a risk level. FIG. 11 is a diagram for describing the determination processing of a risk level. The processing according to the flowchart of FIG. 10 is executed by the control unit 13 that operates as the risk level determination unit 133 in step S111 of FIG. 3.

First, the control unit 13 calculates a risk level index D based on the detection result of the blind spot object 4 in step S107 (S21). The risk level index D indicates an index for determining a risk level of collision between the detected blind spot object 4 and the own vehicle 2. For example, as shown in FIG. 11, the speed $v_1$ at which the blind spot object 4 approaches the own vehicle 2 can be set as the risk level index D.

Next, by using, for example, a preset threshold value Va, the control unit 13 determines whether or not the calculated risk level index D exceeds the threshold value Va (S22). The threshold value Va is set in consideration of the magnitude of the risk level index D that requires a warning regarding, for example, the blind spot object 4. For example, when the risk level index D exceeds the threshold value Va when $D=v_1$, the control unit 13 proceeds to "YES" in step S22.

When determining that the risk level index D exceeds the threshold value Va (YES in S22), the control unit 13 sets, for example, a warning flag to "ON" as a determination result of the risk level (S23). The warning flag is a flag that manages the presence and absence of a warning regarding the blind spot object 4 by "ON/OFF", and is stored in the storage unit 14.

In contrast, when determining that the risk level index D does not exceed the threshold value Va (NO in S22), the control unit 13 sets the warning flag to "OFF" (S24).

When setting the warning flag as described above (S23 and S24), the control unit 13 ends the determination processing of a risk level (S111 in FIG. 3) and proceeds to the processing of step S112.

According to the above processing, a risk level of the blind spot object 4 approaching the own vehicle 2 or the intersection 3 is determined according to the corresponding risk level index D. For example, binary determination is performed according to the warning flag. When the warning flag is "ON", the control unit 13 can cause the notification device 22 to issue a warning or the vehicle drive unit 21 to perform specific control (S112 in FIG. 3).

Note that the determination processing of a risk level is not limited to the binary determination, and for example, a ternary determination for determining the presence or absence of attention calling when a warning is unnecessary may be performed. For example, using a threshold value Vb (<Va) for attention calling, the control unit 13 may determine whether or not D>Vb when proceeding to "NO" in step S22.

In the above processing, the risk level index D is not limited to the speed $v_1$, and can be set by various state variables related to the blind spot object 4. For example, the risk level index D may be set to an acceleration $dv_1/dt$ instead of the speed $v_1$.

Further, the risk level index D may be set to a distance L between the own vehicle 2 and the blind spot object 4. It is considered that the smaller the distance L, the higher the risk level of collision between the own vehicle 2 and the blind spot object 4. In view of the above, for example, in step S22, the control unit 13 may proceed to "YES" when the risk level index D (=L) falls below the threshold value Va, and may proceed to "NO" when the risk level index D (=L) does not fall below the threshold value Va.

Further, the risk level index D may be set by a combination of various state variables. The risk level index D of such an example is shown in the following equation (1):

$$D=|(L_1-v_1\Delta t)+(L_0-v_0\Delta t)| \quad (1)$$

Figure 11:
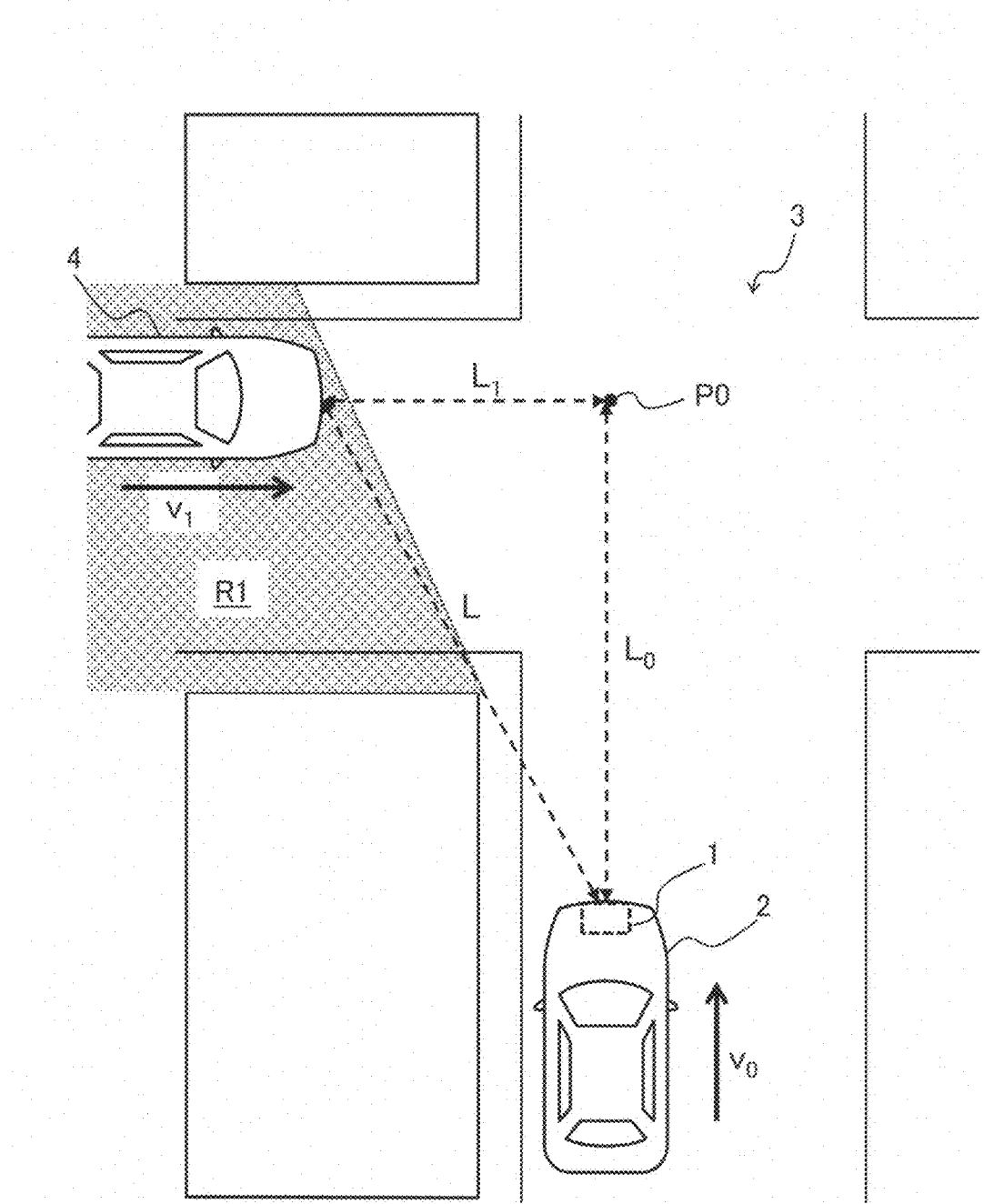
FIG. 11 is a diagram for describing determination processing of a risk level by the sensing device.

In the above equation (1), $L_1$ is a distance from a reference position P0 to the blind spot object 4 (FIG. 11). The reference position P0 is set to a position where collision between the blind spot object 4 and the own vehicle 2 is expected, such as the center of an intersection. The predetermined time width $\Delta t$ is set in the vicinity of, for example, a time width that the own vehicle 2 is predicted to take to reach the reference position P0. The distance $L_0$ is from the reference position P0 to the own vehicle 2. The speed $v_0$ of the own vehicle 2 can be acquired from the in-vehicle sensor 16 and the like.

The risk level index D in the above equation (1) is the sum of a distance between the blind spot object 4 and the reference position P0 and a distance between the reference position P0 and the own vehicle 2 estimated after the time width $\Delta t$ elapses (FIG. 11). According to the above equation (1), when the risk level index D becomes smaller than a predetermined value, it can be estimated that the possibility that the own vehicle 2 and the blind spot object 4 reach the reference position P0 at the same time is sufficiently high. As determination of a risk level corresponding to the above estimation, in the case of the above equation (1), the control unit 13 may proceed to "YES" in step S22 when the risk level index D falls below the threshold value Va and may proceed to "NO" when the risk level index D does not fall below the threshold value Va, as in the case of D=L.

Further, the risk level index D may be set as in the following equation (2) or equation (2'):

$$D=L_1-v_1\Delta t \quad (2)$$

$$D=|L_1-v_1\Delta t| \quad (2')$$

In each of the above equations (2) and (2'), for example, $\Delta t=L_0/v_0$ is set. The time width $\Delta t$ may be set within an allowable range in consideration of a fluctuation of the speed $v_0$ of the own vehicle 2 or an estimation error of the reference position P0.

When the risk level index D in the equation (2) is smaller than the predetermined value (including a negative value), it can be estimated that the possibility that the blind spot object 4 crosses the front of the own vehicle 2 before the own vehicle 2 reaches the reference position P0 is sufficiently high. Further, when the risk level index D (an absolute value in the case of the equation (2)) of equation (2') is smaller than the predetermined value, it can be estimated that the possibility that the own vehicle 2 and the blind spot object 4 exist at the reference position P0 at the same time is sufficiently high. In response to the above estimation, the control unit 13 can use the risk level index D of the equation (2) or the equation (2') to determine a risk level as in the case of the equation (1).

In the above determination processing of a risk level, the threshold value Va may be dynamically changed according to states of the own vehicle 2 and the blind spot object 4. For example, in a case where $L_0$ described above is small, $dv_0/dt$ or $dv_1/dt$ is large, or the blind spot object 4 is estimated to be a person, it is considered that the determination of a risk level should be performed more strictly. In view of the above, when such a case is detected, the control unit 13 may increase the threshold value Va with respect to the risk level index D of the above equation (1), for example.

2-2-3. Case where Another Vehicle in Front Entering Blind Spot Region is Present In step S104 of FIG. 3, in a case where the other vehicle 5 traveling in the same direction as the own vehicle 2 in front of the own vehicle 2 is determined to be in a state of being about to enter the blind spot region R1 (state exemplified in FIG. 1) by changing the traveling direction to the direction of the blind spot region R1 (YES in step S104), the control unit 13 executes measurement processing as corresponding to the above state (S108 to S110).

The control unit 13 as the blind spot object measurement unit 132 first performs measurement using the radar 11 (S108). The radar 11 radiates the physical signal Sa and receives the multiple reflected wave Sb to perform various types of measurement. Next, the control unit 13 acquires a measurement result from the radar 11 (S109).

The control unit 13 performs detection processing of a blind spot object based on the measurement result of the radar 11 (S110). A signal component of the multiple reflected wave Sb has information according to the speed of the blind spot object 4 as a reflection source and the length of the propagation path by the Doppler shift, the phase, and the propagation time. The detection processing of a blind spot object (S110) detects the speed, position, and the like of the blind spot object 4 that reflects the multiple reflected wave Sb by analyzing such a signal component.

For example, in the same manner as in step S11, the control unit 13 removes an environmental component showing a reflected wave from the surrounding environment from a signal of the measurement result of the radar 11 in order to extract a signal component to be analyzed of the blind spot object. Then, for example, in the same manner as in step S12, the control unit 13 performs signal analysis for detecting the blind spot object 4 based on the signal component obtained by removing the environmental component. Next, in the same manner as in step S13, based on an analysis result of the signal analysis, the control unit 13 determines, for example, whether or not a wave source is observed on the further side of the facing wall 32 of a blind spot, and, in this manner, detects the presence or absence of the blind spot object 4. The control unit 13 can determine that the blind spot object 4 is present in a case where a reflected wave is observed in the direction of the other vehicle 5 at a distance exceeding a side surface portion on the own vehicle 2 side of the other vehicle 5.

For example, in the same manner as in step S14, in a case where the control unit 13 determines that a wave source is observed on the further side of the side surface portion on the own vehicle 2 side of the other vehicle 5, various state variables, such as the distance to the blind spot object 4 and speed, are measured according to a propagation path in which refraction due to multiple reflections is estimated.

When step S110 is completed, the control unit 13 executes the processing after the determination processing of a risk level (S111) described above.

3. Summary

As described above, the sensing device 1 according to the first embodiment detects the blind spot object 4 existing in a blind spot in the surrounding environment of the own vehicle 2 which is an example of a moving body. The sensing device 1 includes the radar 11 as a detection unit, the camera 12 as a distance measuring unit, and the control unit 13. The radar 11 radiates the physical signal Sa from the own vehicle 2 to the surrounding environment, and detects the reflected signal Sb of the radiated physical signal Sa. The camera 12 detects distance information indicating a distance from the own vehicle 2 to the surrounding environment. The control unit 13 analyzes the detection result of the radar 11. Based on the detected distance information, the control unit 13 detects the blind spot region R1 indicating a blind spot in the surrounding environment and the other vehicle 5 traveling toward the blind spot region R1 in front of the own vehicle 2 (S102, S103, and S104), and detects the blind spot object 4 in the blind spot region R1 based on the reflected signal Sb reflected by the other vehicle 5 in the detection result of the radar 11 (S110).

According to the above sensing device 1, the physical signal Sa from the radar 11 and the reflected signal Sb reflected by the other vehicle 5 can be used to detect an object existing in a blind spot in the surrounding environment from the own vehicle 2.

In the sensing device 1 of the first embodiment, the control unit 13 determines a risk level regarding the blind spot region R1 based on the detection results (S107 and S110) of the blind spot object 4 (S111). By determination of a risk level, for example, it is possible to easily avoid a collision between the own vehicle 2 and the blind spot object 4 at the crossing and the like.

The moving body system according to the first embodiment includes the sensing device 1 and the vehicle control device 20. Based on the detection result of the sensing device 1, the vehicle control device 20 executes various types of control in the own vehicle 2, such as the notification device 22 and the vehicle drive unit 21. In the moving body system, an object existing in a blind spot in the surrounding environment from the moving body can be detected by the sensing device 1.

The sensing method according to the first embodiment is a sensing method for detecting the blind spot object 4 existing in a blind spot in the surrounding environment of the own vehicle 2. The present method includes step S101 in which the camera 12 detects the distance information indicating a distance from the own vehicle 2 to the surrounding environment, and steps S102 and S103 in which the control unit 13 detects the blind spot region R1 indicating a blind spot in the surrounding environment based on the detected distance information. The present method includes step S104 in which the control unit 13 detects the other vehicle 5 traveling toward the blind spot region R1 in front of the own vehicle 2. The present method includes step S109 in which the radar 11 radiates the physical signal Sa from the own vehicle 2 and detects the reflected signal Sb of the radiated physical signal Sa. The present method includes step S107 in which the control unit 13 detects the blind spot object 4 in the blind spot region R1 based on the reflected signal Sb reflected by the other vehicle 5 in the detection result of the radar 11.

In the first embodiment, a program for causing the control unit 13 to execute the above sensing method is provided. According to the sensing method of the first embodiment, it is possible to detect an object existing in a blind spot in the surrounding environment from a moving body such as the own vehicle 2.

Second Embodiment

Figure 12:
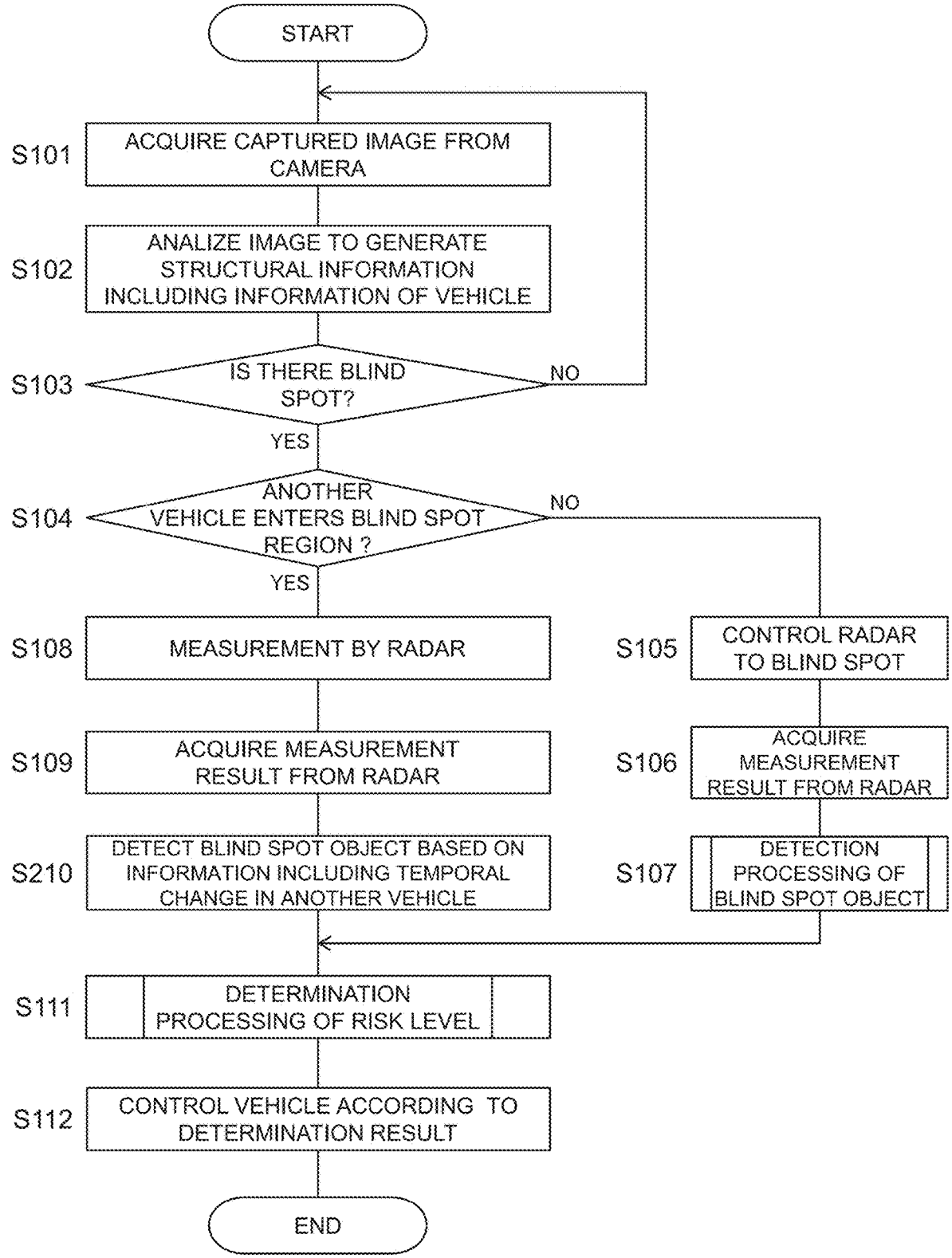
FIG. 12 is a flowchart for describing operation of the sensing device according to a second embodiment.

FIG. 12 is a flowchart for describing detection operation according to a second embodiment by the sensing device 1. The flowchart of the second embodiment shown in FIG. 12 includes step S210 of detecting a blind spot object based on information including a temporal change in the other vehicle 5 instead of step S110 of the flowchart of the first embodiment of FIG. 3.

Figure 13:
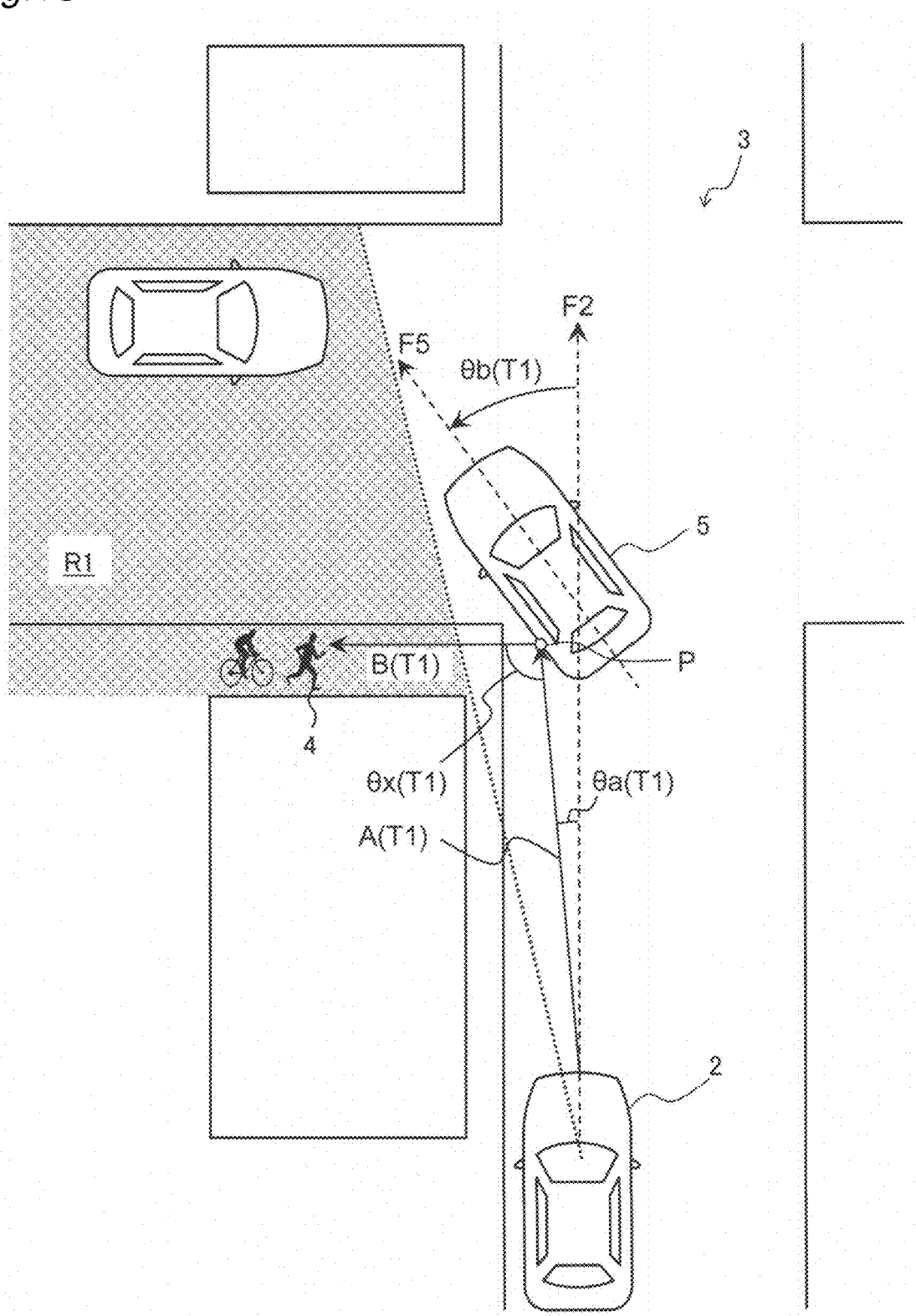
FIG. 13 is a diagram for describing detection processing of a blind spot object by the sensing device.
Figure 14:
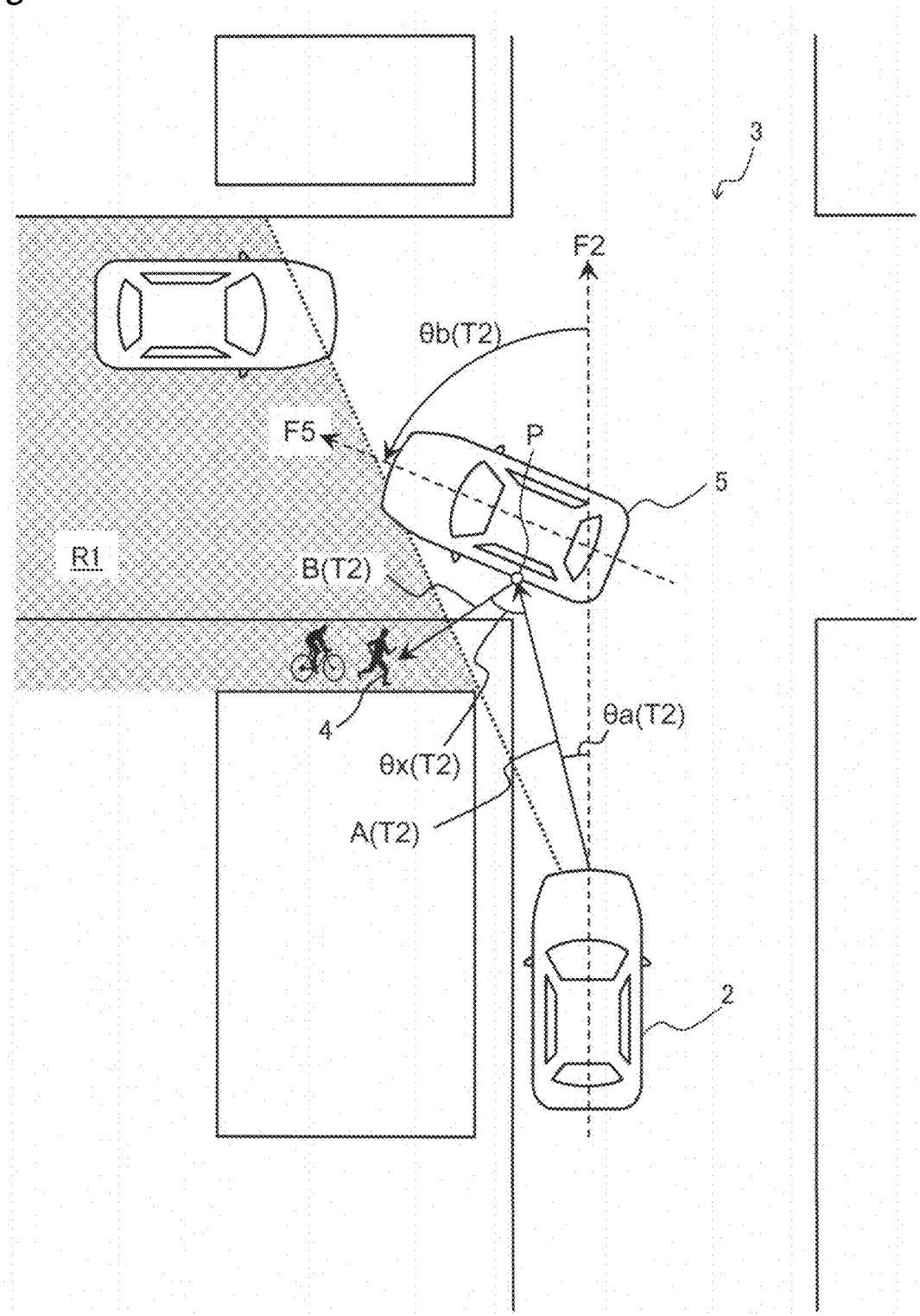
FIG. 14 is a diagram for describing detection processing of a blind spot object by the sensing device.

FIGS. 13 and 14 are diagrams for describing step S210 of detecting a blind spot object based on information including a temporal change in the other vehicle 5. FIG. 13 is a diagram showing states of the own vehicle 2, the other vehicle 5, and the blind spot object 4 at a time T1. In FIG. 13, the own vehicle 2 is moving in the direction of a traveling direction F2 indicated by a broken line arrow.

Note that the traveling direction F2 is the direction in which the own vehicle 2 should move if a driving force is applied, and even if the own vehicle 2 is stopped in FIG. 13, the traveling direction of the own vehicle 2 is represented by F2. In a case where the own vehicle 2 travels backward (back), the traveling direction F2 is opposite to that shown in FIG. 13. In the example of FIG. 13, the traveling direction F2 of the own vehicle 2 passes through the center of the vehicle body of the own vehicle 2 and is parallel to the longitudinal axis of the own vehicle 2.

In FIG. 13, the other vehicle 5 is in front of the own vehicle 2. Before the time T1, the other vehicle 5 travels in the same direction as the own vehicle 2 in front of the own vehicle 2, and, at the time T1 in FIG. 13, the other vehicle 5 changes the traveling direction to the direction of the blind spot region R1 and is about to enter the blind spot region R1. A broken line arrow F5 indicates the traveling direction of the other vehicle 5.

A first angle θb(T1) is the angle formed by the traveling direction F2 of the own vehicle 2 and the traveling direction F5 of the other vehicle 5 at the time T1.

In the state shown in FIG. 13, the blind spot region R1 is detected (YES in S103), and the other vehicle 5 traveling in the same direction as the own vehicle 2 in front of the own vehicle 2 changes the traveling direction to the direction of the blind spot region R1 and is in a state of being about to enter the blind spot region R1 (YES in S104). Accordingly, the control unit 13 performs the processing of steps S108, S109, and S210.

In step S210, the control unit 13 can determine that the blind spot object 4 is present since the reflected wave Sb is observed in the direction of the other vehicle 5 at a distance exceeding the side surface portion on the own vehicle 2 side of the other vehicle 5. Since the radar 11 radiates the physical signal Sa in a pulse shape as described above, it is possible to grasp when and in what direction the physical signal Sa to which the reflected wave Sb corresponds is radiated. Therefore, in a case of determining that the blind spot object 4 is present, the control unit 13 can identify the radiation direction of the physical signal Sa corresponding to the reflected wave Sb. The radiation angle (first angle) $\theta a(T1)$ of the physical signal Sa is the angle formed by the traveling direction F2 of the own vehicle 2 and the radiation direction of the physical signal Sa.

As shown in FIG. 13, the physical signal Sa radiated from the own vehicle 2 in the direction of the first angle $\theta a(T1)$ is reflected at a reflection point P of the other vehicle 5 and reaches the blind spot object 4. When a first distance $A(T1)$ between the radiation position of the physical signal Sa of the own vehicle 2 and the reflection point P of the other vehicle 5 at the time T1, and a second distance $C(T1)$ between the radiation position of the physical signal Sa of the own vehicle 2 and the blind spot object 4 are used, a third distance $B(T1)$ between the reflection point P of the other vehicle 5 and the blind spot object 4 is expressed by the following equation (3):

$$B(T1)=C(T1)-A(T1) \quad (3)$$

Note that the first distance $A(T1)$ can be calculated by performing image analysis on the captured image acquired by the camera 12 (S102). Further, the second distance $C(T1)$ is acquired as a measurement result made by the radar 11 (S109).

Further, an angle $\theta x(T1)$ formed by a line segment connecting the radiation position of the physical signal Sa of the own vehicle 2 and the reflection point P of the other vehicle 5 and a line segment connecting the reflection point P of the other vehicle 5 and the blind spot object 4 at the time T1 is expressed by the following equation (4):

$$\theta x(T1)=180°-2\theta b(T1)+2\theta a(T1) \quad (4)$$

Since the above geometric information can be obtained, the control unit 13 can identify the position of the blind spot object 4.

FIG. 14 is a diagram showing states of the own vehicle 2, the other vehicle 5, and the blind spot object 4 at a time T2 (>T1). The other vehicle 5 is turning further from the state of the time T1. At the time T2, the above equations (3) and (4) are also established. That is, the following equations (5) and (6) are established:

$$B(T2)=C(T2)-A(T2) \quad (5)$$

$$\theta x(T2)=180°-2\theta b(T2)+2\theta a(T2) \quad (6)$$

As described above, the position of the blind spot object 4 at the times T1 and T2 can be identified from the radiation position of the physical signal Sa of the own vehicle 2, the result of the image analysis (S102), and the measurement result (S109) by the radar 11. In this manner, the control unit 13 can determine, for example, whether or not the blind spot object 4 such as a person is moving toward the intersection 3 or a point of the moving destination of the own vehicle 2. Further, the speed of the blind spot object 4 in a case of moving can be calculated.

Using the obtained position, moving direction, speed, and the like of the blind spot object 4, the determination processing of a risk level is executed as in the first embodiment (S111).

As described above, in the sensing device 1 according to the second embodiment, the control unit 13 calculates the first angle $\theta b$ formed by the traveling direction F2 of the own vehicle 2 and the traveling direction F5 of the other vehicle 5 and the first distance A between the radar 11 and the reflection point P of the other vehicle 5 based on the distance information. The control unit 13 calculates the third distance B between the other vehicle 5 and the blind spot object based on the first distance A and the second distance C between the own vehicle 2 and the blind spot object 4 calculated based on the detection result made by the radar 11.

Further, the control unit 13 calculates the angle $\theta x$ formed by a line segment connecting the radar 11 and the reflection point P of the other vehicle 5 and a line segment connecting the reflection point P of the other vehicle 5 and the blind spot object 4 based on the equation (4) or (6). Here, $\theta b$ is the first angle, and $\theta a$ is the second angle formed by the traveling direction F2 of the own vehicle 2 and the radiation direction of the physical signal Sa.

In this manner, the control unit 13 can identify the position of the blind spot object 4 in detail.

Further, the control unit 13 determines a risk level regarding the blind spot region based on at least one of the second distance C, a temporal change in the second distance C, the third distance B, and a temporal change in the third distance B. By using the position of the blind spot object 4 identified in detail for the determination of a risk level, a risk level can be determined with high accuracy, and, for example, a collision at the crossing between the own vehicle 2 and the blind spot object 4 can be easily avoided.

Third Embodiment

Figure 15:
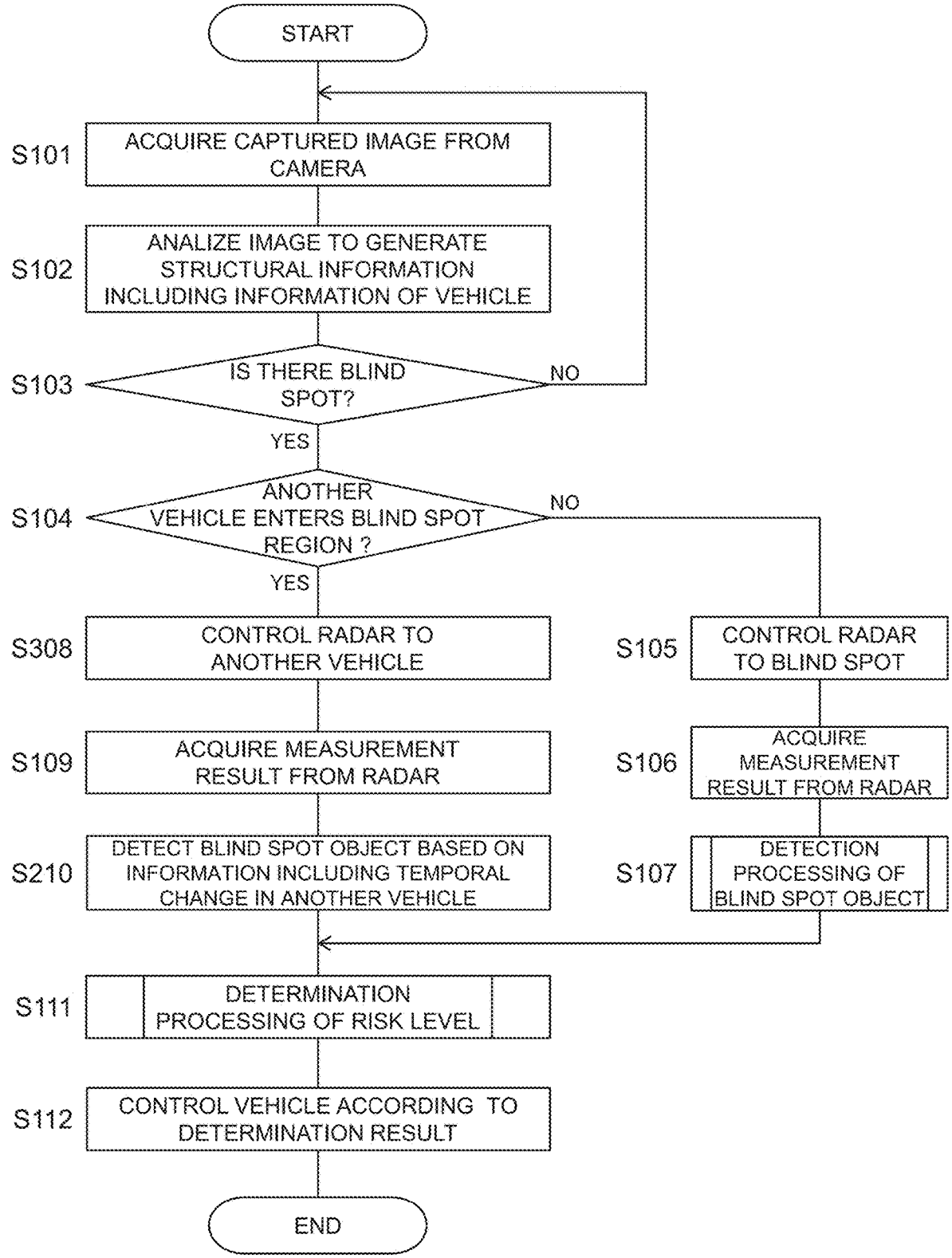
FIG. 15 is a flowchart for describing operation of the sensing device according to a third embodiment.

FIG. 15 is a flowchart for describing the detection operation according to the third embodiment by the sensing device 1. In a process indicated by the flowchart of the third embodiment shown in FIG. 15, unlike the second embodiment, in a case where the blind spot region R1 is detected (YES in S103), and the other vehicle 5 traveling in the same direction as the own vehicle 2 in front of the own vehicle 2 changes the traveling direction to the direction of the blind spot region R1 and is in a state of being about to enter the blind spot region R1 (YES in S104), the control unit controls the radar 11 toward the other vehicle 5 (S308).

Figure 16:
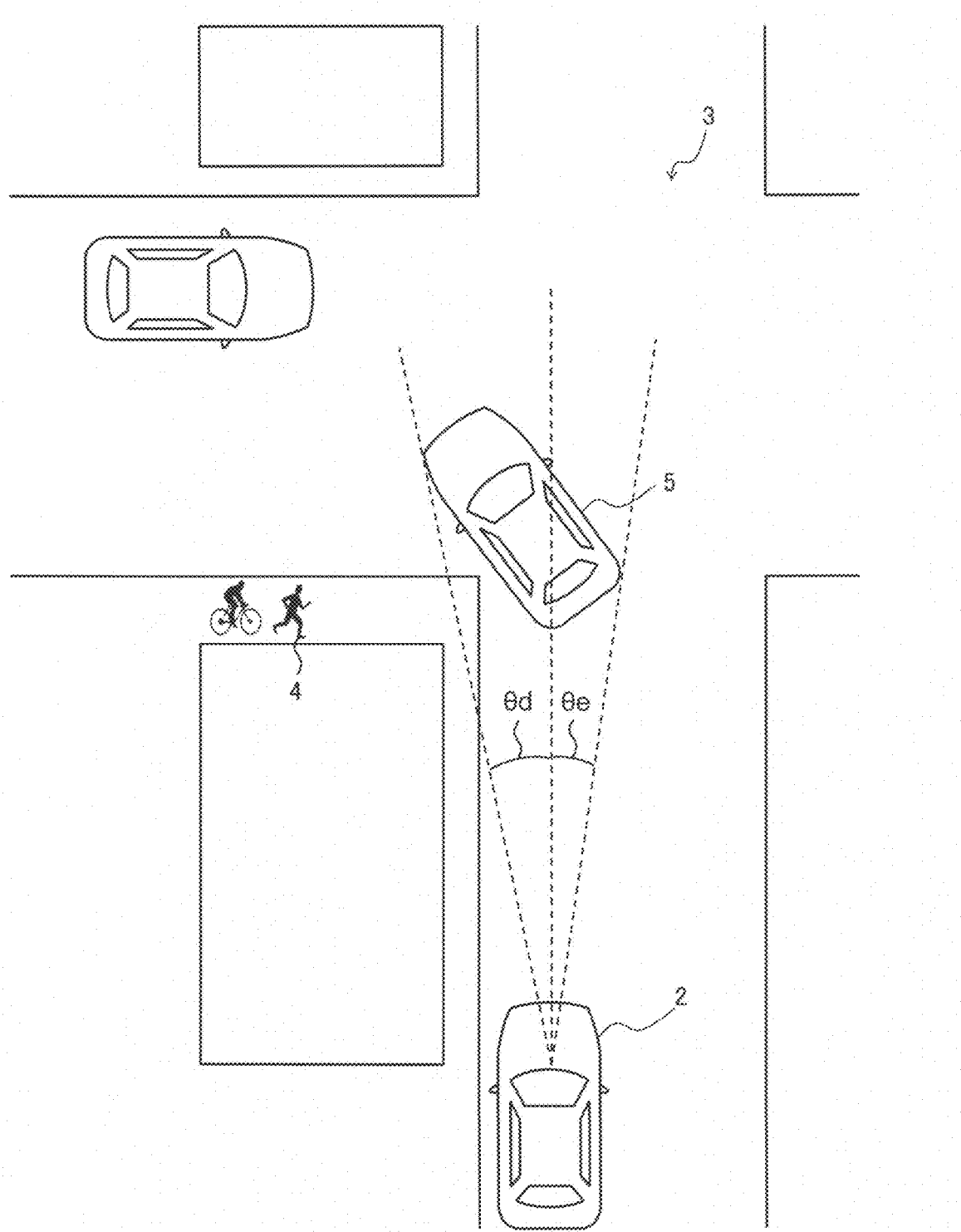
FIG. 16 is a diagram for describing the operation of the sensing device according to the third embodiment.

As described in the first and second embodiments, in a case of YES in S104, the sensing device 1 causes the physical signal Sa radiated from the radar 11 to be reflected by the other vehicle 5 and to reach the blind spot object 4. Therefore, in a case of YES in S104, the radiation angle $\theta a$ of the physical signal Sa radiated from the radar 11 only needs to satisfy $-\theta e<\theta a<\theta d$ (see FIG. 16), and the physical signal Sa does not need to be radiated to a range other than this.

$\theta d$ and $\theta e$ are determined based on the position and shape of the other vehicle 5 acquired by image analysis performed on the captured image acquired by the camera 12 (S102).

The process of the operation of step S109 and subsequent steps after step S308 for controlling the radar 11 toward the other vehicle 5, which is the same as the process of the operation shown in FIG. 12 in the second embodiment, will be omitted from the description.

As described above, in the sensing device 1 according to the third embodiment, when detecting the other vehicle 5 traveling toward the blind spot region R1 in front of the own vehicle 2, the control unit 13 controls the radar 11 to radiate the physical signal Sa toward the detected other vehicle 5. In this manner, only a narrow range facing the other vehicle 5 needs to be scanned by the physical signal Sa of the radar 11. Therefore, the control unit 13 can grasp the position of the blind spot object 4 at a high frame rate, for example. Therefore, the position and speed of the blind spot object 4 can be grasped with high accuracy. In a case where the risk level determination is performed, a risk level can be determined with high accuracy. Accordingly, a collision at the crossing between the own vehicle 2 and the blind spot object 4 can be easily avoided, for example.

Other Embodiments

In the above first embodiment, the multiple reflected wave is utilized for detecting the blind spot object 4. However, the wave is not limited to the multiple reflected wave, and for example, a diffracted wave may be utilized. The present variation will be described with reference to FIG. 17.

Figure 17:
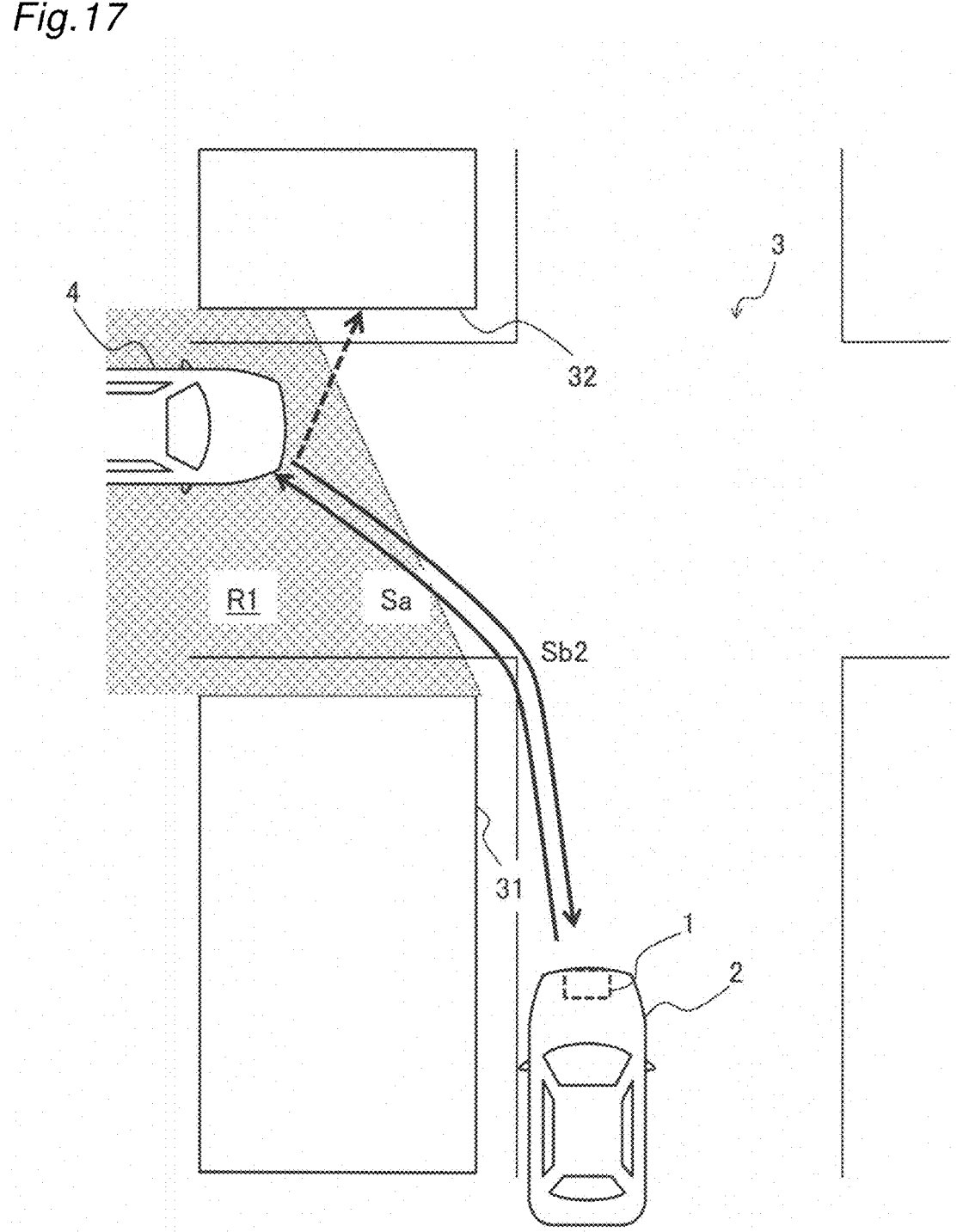
FIG. 17 is a diagram for describing a variation of the operation of the sensing device.

In FIG. 17, the physical signal Sa from the radar 11 is diffracted on the shielding wall 31 and reaches the blind spot object 4. Further, the reflected wave of the blind spot object 4 is diffracted by the shielding wall 31 and returns to the own vehicle 2 as a diffracted wave Sb2. For example, the control unit 13 of the present embodiment controls the wavelength and direction of the physical signal Sa radiated from the radar 11 so as to cause wraparound at the shielding wall 31 in step S105 of FIG. 3.

For example, as the physical signal Sa having a wavelength larger than that of visible light is used, the signal can be allowed to reach even a region which cannot be geometrically reached by visible light having high straightness and the like due to the existence of various shielding objects. Further, since a vehicle, a person, and the like that can be the blind spot object 4 usually have a rounded shape, the signal is reflected not only to a completely reflexive path, but also in the direction in which the own vehicle 2 from which the signal is radiated exists. When such a reflected wave causes a diffraction phenomenon with respect to the shielding wall 31 and propagates, the radar 11 can receive the diffracted wave Sb2 as a signal component to be analyzed.

The signal component of the diffracted wave Sb2 has information on the propagation path to the blind spot object 4 and Doppler information according to the moving speed. Therefore, as signal analysis is performed on the signal component, the position and speed of the blind spot object 4 can be measured from the information on the propagation time, phase, and frequency of the signal component, as in the first embodiment. At this time, the propagation path of the diffracted wave Sb2 can also be estimated from the distance to the shielding wall 31 or various types of the structural information D1. Further, the propagation path in which multiple reflection and diffraction are combined can also be estimated as appropriate, and the signal component of such a wave may be analyzed.

Each of the above embodiments describes the example in which the camera 12 captures the surrounding environment of the own vehicle, and the control unit 13 performs image analysis on the acquired captured image to generate structural information regarding the current surrounding environment of the own vehicle 2. The structural information may include information indicating the shape of the other vehicle 5, particularly the shape near the reflection point P of the other vehicle 5. In step S104 of each of the above embodiments, in a case where the other vehicle 5 traveling in the same direction as the own vehicle 2 in front of the own vehicle 2 is determined to be in a state of being about to enter the blind spot region R1 by changing the traveling direction to the direction of the blind spot region R1 (YES in step S104), the control unit 13 identifies the position of the blind spot object 4 by using the fact that the physical signal S a radiated from the radar 11 to the other vehicle 5 is reflected at the reflection point P. At this time, if the information indicating the shape of the other vehicle 5 obtained by the image analysis, particularly the shape near the reflection point P of the other vehicle 5, is used, for example, the direction in which the physical signal Sa should be emitted can be controlled so that the physical signal Sa reliably propagates in the direction of the blind spot region R1 through the reflection point P of the other vehicle 5. Further, as the shape of the other vehicle 5 and the information of the reflected signal Sb such as the arrival angle are combined, the position of the blind spot object 4 can be identified with high accuracy.

Further, in each of the above embodiments, the radar 11 is described as an example of the detection unit. The detection unit of the present embodiment is not limited to the radar 11, and may be, for example, LIDAR. The physical signal Sa radiated from the detection unit may be, for example, an infrared ray. Further, the detection unit may be a sonar or may emit an ultrasonic wave as the physical signal Sa. In these cases, the wave signal Sb received by the detection unit is set in the same manner as the corresponding physical signal Sa.

Further, in each of the above embodiments, the example is described in which the radar 11 and the camera 12 are installed in a manner facing the front of the own vehicle 2. However, the installation position of the radar 11 and the like is not particularly limited. For example, the radar 11 and the like may be arranged to face the rear of the own vehicle 2, and for example, the moving body system may be used for parking assistance.

Further, in each of the above embodiments, an automobile is exemplified as an example of the moving body. The moving body on which the sensing device 1 is mounted is not particularly limited to an automobile, and may be, for example, an AGV. For example, the sensing device 1 may detect an object in a blind spot by monitoring the surroundings during the automatic traveling of the AGV.

Additional Note

Various embodiments of the present disclosure are described above. However, the present disclosure is not limited to the above content, and various changes can be made within the scope of substantially the same technical idea. Hereinafter, various aspects according to the present disclosure will be added.

The first aspect of the present disclosure provides a sensing device (1) that detects an object existing in a blind spot in a surrounding environment of a moving body (2). The sensing device (1) includes a detection unit (11), a distance measuring unit (12), and a control unit (13). The detection unit radiates a physical signal from the moving body to the surrounding environment and detects a reflected signal (Sb) of the radiated physical signal. The distance measuring unit detects distance information indicating a distance from the moving body to the surrounding environment. The control unit analyzes a detection result made by the detection unit. The control unit detects a blind spot region indicating a blind spot (R1) in the surrounding environment and another moving body (5) traveling toward the blind spot region in front of the moving body based on the distance information (S102, S103, S104), and then detects an object (4) in the blind spot region based on the reflected signal reflected by the other moving body in a detection result of the detection unit (S110).

The second aspect of the present disclosure provides the sensing device according to the first aspect, wherein when the other moving body traveling toward the blind spot region in front of the moving body is detected, the control unit controls the detection unit to radiate the physical signal toward the detected other moving body (S308).

The third aspect of the present disclosure provides the sensing device according to the first or second aspect, wherein the control unit calculates a first angle (θb) formed by a traveling direction of the moving body and a traveling direction of the other moving body and a first distance (A) between the detection unit and a reflection point of the other moving body based on the distance information, and calculates a third distance (B) between the other moving body and an object in the blind spot region based on the first distance (A) and a second distance (C) between the moving body and an object in the blind spot region calculated based on a detection result made by the detection unit.

The fourth aspect of the present disclosure provides the sensing device according to the third aspect, wherein the control unit calculates, based on an equation (1), an angle θx formed by a line segment connecting the detection unit and a reflection point of the other moving body and a line segment connecting a reflection point of the other moving body and an object in the blind spot region, $$\theta x=180°-2\theta b+2\theta a$$

wherein θb is the first angle, and θa is a second angle formed by a traveling direction of the moving body and a radiation direction of the physical signal.

The fifth aspect of the present disclosure provides the sensing device according to any one of the above aspects, wherein the control unit determines a risk level regarding the blind spot region based on a detection result of an object in the blind spot region.

The sixth aspect of the present disclosure provides the sensing device according to the third or fourth aspect, wherein the control unit determines a risk level regarding the blind spot region based on at least one of the second distance (C), a temporal change in the second distance, the third distance (B), and a temporal change in the third distance.

The seventh aspect of the present disclosure provides the sensing device according to any one of the above aspects, further comprising a drive unit (21) that drives the moving body according to a detection result of the control unit.

The eighth aspect of the present disclosure provides the sensing device according to any one of the above aspects, further comprising a notification unit (22) that performs notification to a user of the moving body according to a detection result of the control unit.

The ninth aspect of the present disclosure provides the sensing device according to the fifth or sixth aspect, further comprising a drive unit that drives the moving body according to the risk level.

The tenth aspect of the present disclosure provides the sensing device according to any one of the fifth, the sixth and the ninth aspects, further comprising a notification unit (22) that performs notification to a user of the moving body according to the risk level.

The eleventh aspect of the present disclosure provides the sensing device according to any one of the above aspects, wherein the distance measuring unit includes at least one of a camera, a radar, LIDAR, and a navigation device.

The twelfth aspect of the present disclosure provides the sensing device according to any one of the above aspects, wherein the physical signal includes at least one of an infrared ray, a terahertz wave, a millimeter wave, a microwave, a radio wave, and an ultrasonic wave.

The thirteenth aspect of the present disclosure provides a moving body system including the sensing device according to any one of the above aspects and a control device (20). The control device controls the moving body based on a detection result of the sensing device.

The fourteenth aspect of the present disclosure provides a sensing method of detecting an object existing in a blind spot in a surrounding environment of a moving body (2). The method includes the steps of:

a distance measuring unit (12) detecting (S101) distance information indicating a distance from the moving body to the surrounding environment;

a control unit (13) detecting (S102, S103) a blind spot region (R1) indicating a blind spot in the surrounding environment based on the distance information; and the control unit detecting (S102, S104) another moving body (5) traveling toward the blind spot region in front of the moving body.

The method further includes a step (S108) of a detection unit radiating a physical signal (Sa) from the moving body to the surrounding environment and detecting a reflected signal (Sb) of the radiated physical signal.

The method further includes a step (S110) of the control unit detecting an object (4) in the blind spot region based on the reflected signal reflected by the other moving body in a detection result of the detection unit.

The fifteenth aspect of the present disclosure provides a program for causing a control unit to execute the sensing method according to the fourteenth aspect.

The invention claimed is:

1. A sensing device that is mounted on a moving body and detects an object existing in a blind spot in a surrounding environment of the moving body, the sensing device comprising:

a detector that radiates a physical signal from the moving body to the surrounding environment and detects a reflected signal of the radiated physical signal;

a distance measuring unit that detects distance information indicating a distance from the moving body to the surrounding environment; and a control circuit that analyzes a detection result made by the detection unit, wherein the control unit detects a blind spot region indicating a blind spot in the surrounding environment and then detects another moving body traveling toward the detected blind spot region in front of the moving body based on the distance information, and detects an object in the blind spot region based on the reflected signal radiated from the moving body and reflected by a surface of the other moving body in a detection result of the detection unit.

2. The sensing device according to claim 1, wherein when the other moving body traveling toward the blind spot region in front of the moving body is detected, the control circuit controls the detector to radiate the physical signal toward the detected other moving body.

3. The sensing device according to claim 1, wherein
the control circuit calculates a first angle formed by a traveling direction of the moving body and a traveling direction of the other moving body and a first distance between the detector and a reflection point of the other moving body based on the distance information, and
calculates a third distance between the other moving body and an object in the blind spot region based on the first distance and a second distance between the moving body and an object in the blind spot region calculated based on a detection result made by the detection unit.

4. The sensing device according to claim 3, wherein
the control circuit calculates, based on an equation (1), an angle θx formed by a line segment connecting the detector and a reflection point of the other moving body and a line segment connecting a reflection point of the other moving body and an object in the blind spot region, $$\theta x = 180° - 2\theta b + 2\theta a \quad (1)$$

wherein θb is the first angle, and θa is a second angle formed by a traveling direction of the moving body and a radiation direction of the physical signal.

5. The sensing device according to claim 1, wherein the control circuit determines a risk level regarding the blind spot region based on a detection result of an object in the blind spot region.

6. The sensing device according to claim 3, wherein the control circuit determines a risk level regarding the blind spot region based on at least one of the second distance, a temporal change in the second distance, the third distance, and a temporal change in the third distance.

7. The sensing device according to claim 1, further comprising a drive unit that drives the moving body according to a detection result of the control unit.

8. The sensing device according to claim 1, further comprising a notification device that performs notification to a user of the moving body according to a detection result of the control unit.

9. The sensing device according to claim 5, further comprising a drive unit that drives the moving body according to the risk level.

10. The sensing device according to claim 5, further comprising a notification device that performs notification to a user of the moving body according to the risk level.

11. The sensing device according to claim 1, wherein the distance measuring unit includes at least one of a camera, a radar, LIDAR, and a navigation device.

12. The sensing device according to claim 1, wherein the physical signal includes at least one of an infrared ray, a terahertz wave, a millimeter wave, a microwave, a radio wave, and an ultrasonic wave.

13. A moving body system comprising:
the sensing device according to claim 1; and
a control device that controls the moving body based on a detection result of the sensing device.

14. A sensing method of detecting an object existing in a blind spot in a surrounding environment of a moving body, the sensing method comprising the steps of:
a distance measuring unit mounted on the moving body detecting distance information indicating a distance from the moving body to the surrounding environment;
a control circuit mounted on the moving body detecting a blind spot region indicating a blind spot in the surrounding environment based on the distance information;
the control circuit detecting another moving body traveling toward the blind spot region in front of the moving body;
a detector mounted on the moving body radiating a physical signal from the moving body to the surrounding environment and detecting a reflected signal of the radiated physical signal; and
the control circuit detecting an object in the blind spot region based on the reflected signal radiated from the moving body and reflected by a surface of the other moving body in a detection result of the detection unit.

15. A program for causing a control circuit to execute the sensing method according to claim 14.

\* \* \* \* \*